US011759993B2

United States Patent
Ringel

(10) Patent No.: US 11,759,993 B2
(45) Date of Patent: Sep. 19, 2023

(54) PANEL DEVICE AND METHOD OF MANUFACTURING

(71) Applicant: Nissan Ringel, Brooklyn, NY (US)

(72) Inventor: Nissan Ringel, Brooklyn, NY (US)

( * ) Notice: Subject to any disclaimer, the term of this patent is extended or adjusted under 35 U.S.C. 154(b) by 257 days.

(21) Appl. No.: 17/069,613

(22) Filed: Oct. 13, 2020

(65) Prior Publication Data
US 2021/0023765 A1    Jan. 28, 2021

Related U.S. Application Data

(63) Continuation-in-part of application No. 16/405,659, filed on May 7, 2019, now abandoned, which is a
(Continued)

(51) Int. Cl.
*B29C 51/08* (2006.01)
*B29C 51/12* (2006.01)
*B29C 51/42* (2006.01)
*A47F 5/00* (2006.01)
*A47F 11/10* (2006.01)
*A47B 96/02* (2006.01)
*B29L 31/44* (2006.01)
*B29C 35/16* (2006.01)

(52) U.S. Cl.
CPC ............ *B29C 51/08* (2013.01); *A47B 96/021* (2013.01); *A47F 5/0018* (2013.01); *A47F 5/0043* (2013.01); *A47F 11/10* (2013.01); *B29C 51/12* (2013.01); *B29C 51/42* (2013.01); *A47B 2220/0077* (2013.01); *B29C 2035/1658* (2013.01); *B29C 2035/1666* (2013.01); *B29K 2995/0034* (2013.01); *B29L 2031/445* (2013.01)

(58) Field of Classification Search
CPC .......... B29C 51/08; B29C 51/12; B29C 51/42
See application file for complete search history.

(56) References Cited

U.S. PATENT DOCUMENTS 3,900,640 A * 8/1975 Vecchiotti ............... B32B 27/20
                                                          138/146
4,112,485 A    9/1978 Sutter
(Continued)

OTHER PUBLICATIONS

Office Action dated Jun. 29, 2018, issued in connection with U.S. Appl. No. 15/411,293 (22 pages).
(Continued)

*Primary Examiner* — Matthew J Daniels
(74) *Attorney, Agent, or Firm* — McCarter & English, LLP

(57) ABSTRACT

The present disclosure relates to a method of manufacturing a composite plastic component having a first section surrounded by a second section. The method includes positioning a first section on a mold, the mold having a curved top surface. The method includes heating a second section in the form of a frame, and positioning the second section about the first section on the mold. The method includes pressing the first and second sections on the curved mold to curve the first and second sections in conformance with the curve of the mold, and to attach the frame to the first section. The method includes removing the curved first section and frame from the mold, cooling the curved first section and frame, and allowing the first section to return from a curved shape to a planar shape.

18 Claims, 34 Drawing Sheets

Related U.S. Application Data continuation-in-part of application No. 15/411,293, filed on Jan. 20, 2017, now Pat. No. 10,278,523.

(60) Provisional application No. 62/280,913, filed on Jan. 20, 2016.

(56) References Cited

U.S. PATENT DOCUMENTS

| | | | |
|---|---|---|---|
| 5,632,133 A * | 5/1997 | Wyslotsky | B65B 47/10 |
| | | | 53/433 |
| 6,179,434 B1 | 1/2001 | Saraiji | |
| 8,439,418 B1 | 5/2013 | Lovejoy et al. | |
| 8,562,167 B1 | 10/2013 | Meier et al. | |
| 9,508,273 B2 | 11/2016 | Hermes, III | |
| 10,278,523 B2 | 5/2019 | Ringel | |
| 2001/0036070 A1 | 11/2001 | Compagnucci et al. | |
| 2002/0093832 A1 | 7/2002 | Hamilton | |
| 2006/0181885 A1 | 8/2006 | Seng Tong | |
| 2007/0127261 A1 | 6/2007 | An et al. | |
| 2007/0217191 A1 | 9/2007 | Tsai | |
| 2008/0289682 A1 * | 11/2008 | Adriani | B32B 17/10889 |
| | | | 257/E31.13 |
| 2009/0021927 A1 | 1/2009 | Hall et al. | |
| 2010/0133208 A1 | 6/2010 | Seo et al. | |
| 2011/0167690 A1 | 7/2011 | Bjarnason et al. | |
| 2011/0205758 A1 | 8/2011 | Kim et al. | |
| 2011/0273867 A1 | 11/2011 | Horst et al. | |
| 2012/0026751 A1 | 2/2012 | Lin et al. | |
| 2012/0043338 A1 | 2/2012 | Yang et al. | |
| 2012/0182747 A1 | 7/2012 | Doubek | |
| 2015/0023000 A1 | 1/2015 | Kendall et al. | |
| 2015/0279251 A1 | 10/2015 | Matyear | |
| 2016/0282539 A1 | 9/2016 | Li et al. | |
| 2017/0202372 A1 * | 7/2017 | Ringel | A47B 96/028 |
| 2019/0261788 A1 | 8/2019 | Ringel | |

OTHER PUBLICATIONS

Notice of Allowance dated Dec. 7, 2018, issued in connection with U.S. Appl. No. 15/411,293 (8 pages).

Corrected Notice of Allowability dated Jan. 23, 2019, issued in connection with U.S. Appl. No. 15/411,293 (5 pages).

Examiner-Initiated Interview Summary dated Jan. 23, 2019, issued in connection with U.S. Appl. No. 15/411,293 (1 page).

Office Action dated Feb. 11, 2020, issued in connection with U.S. Appl. No. 16/405,659 (21 pages).

Office Action dated Jun. 12, 2020, issued in connection with U.S. Appl. No. 16/405,659 (25 pages).

* cited by examiner

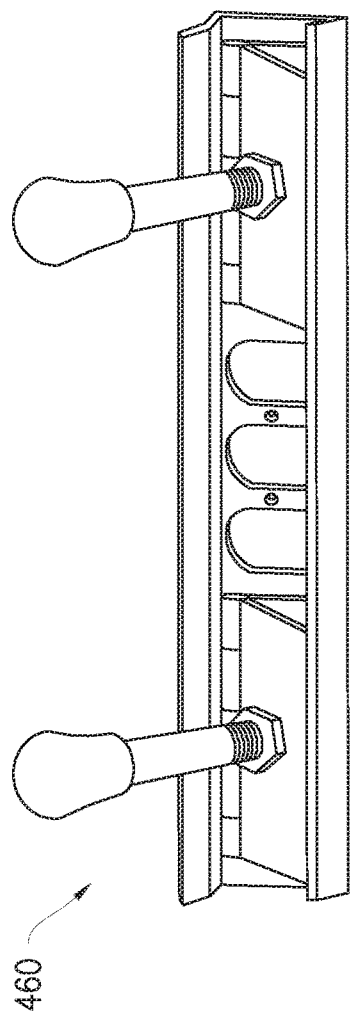
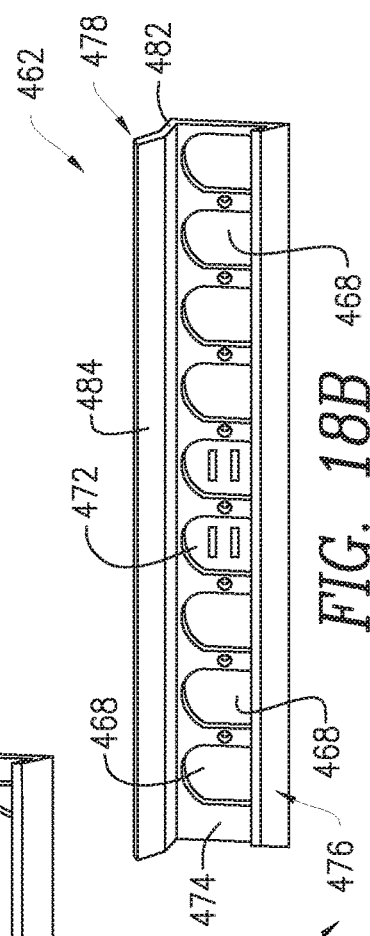
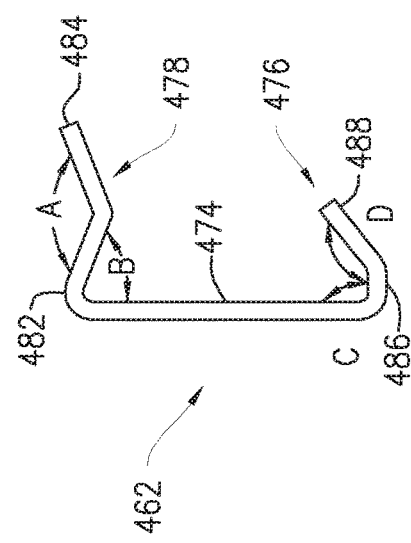
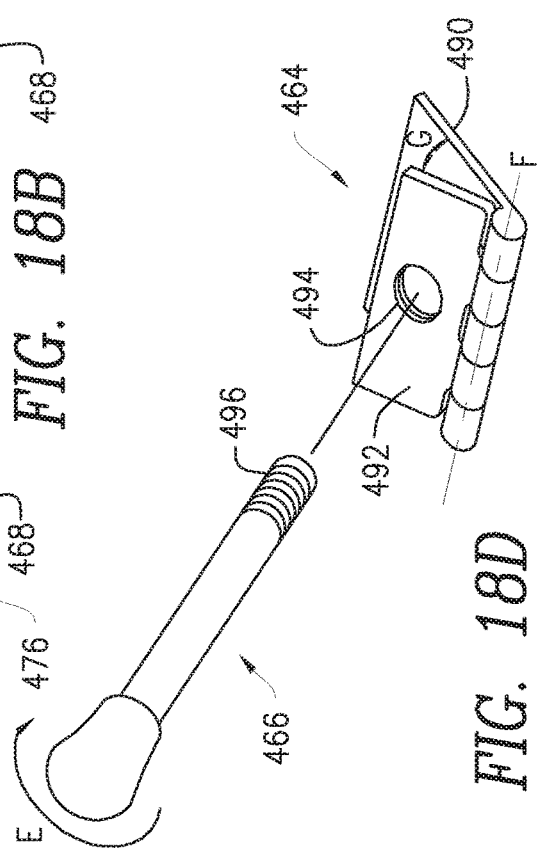
FIG. 18A
FIG. 18B
FIG. 18C
FIG. 18D

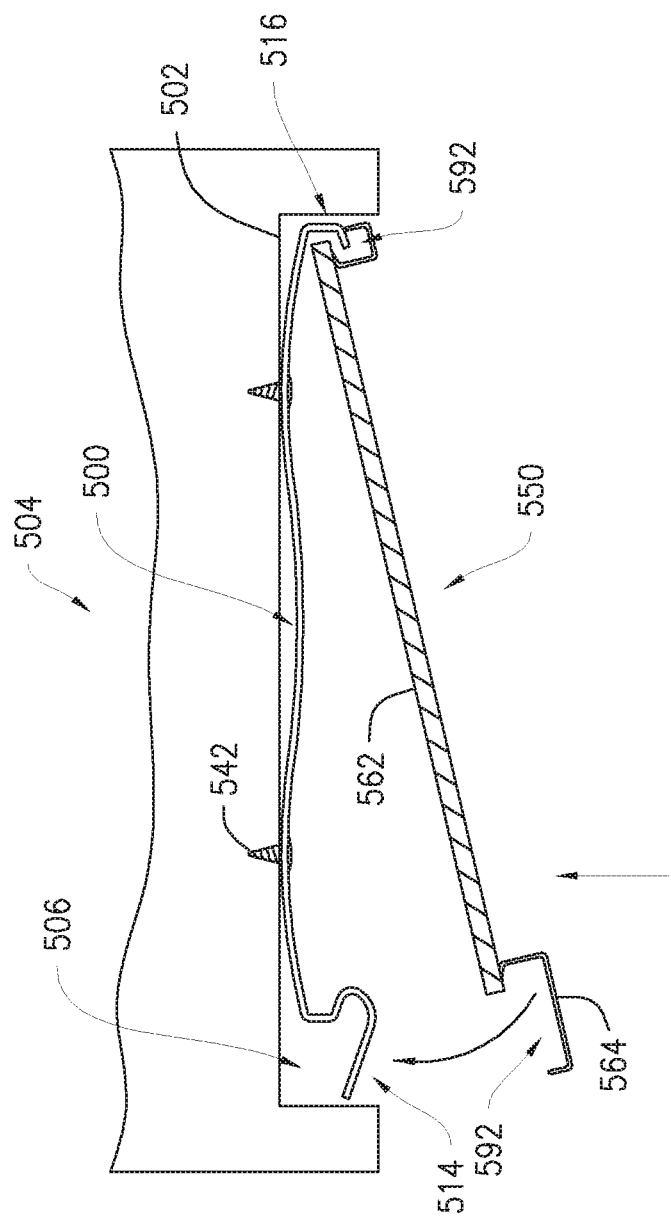

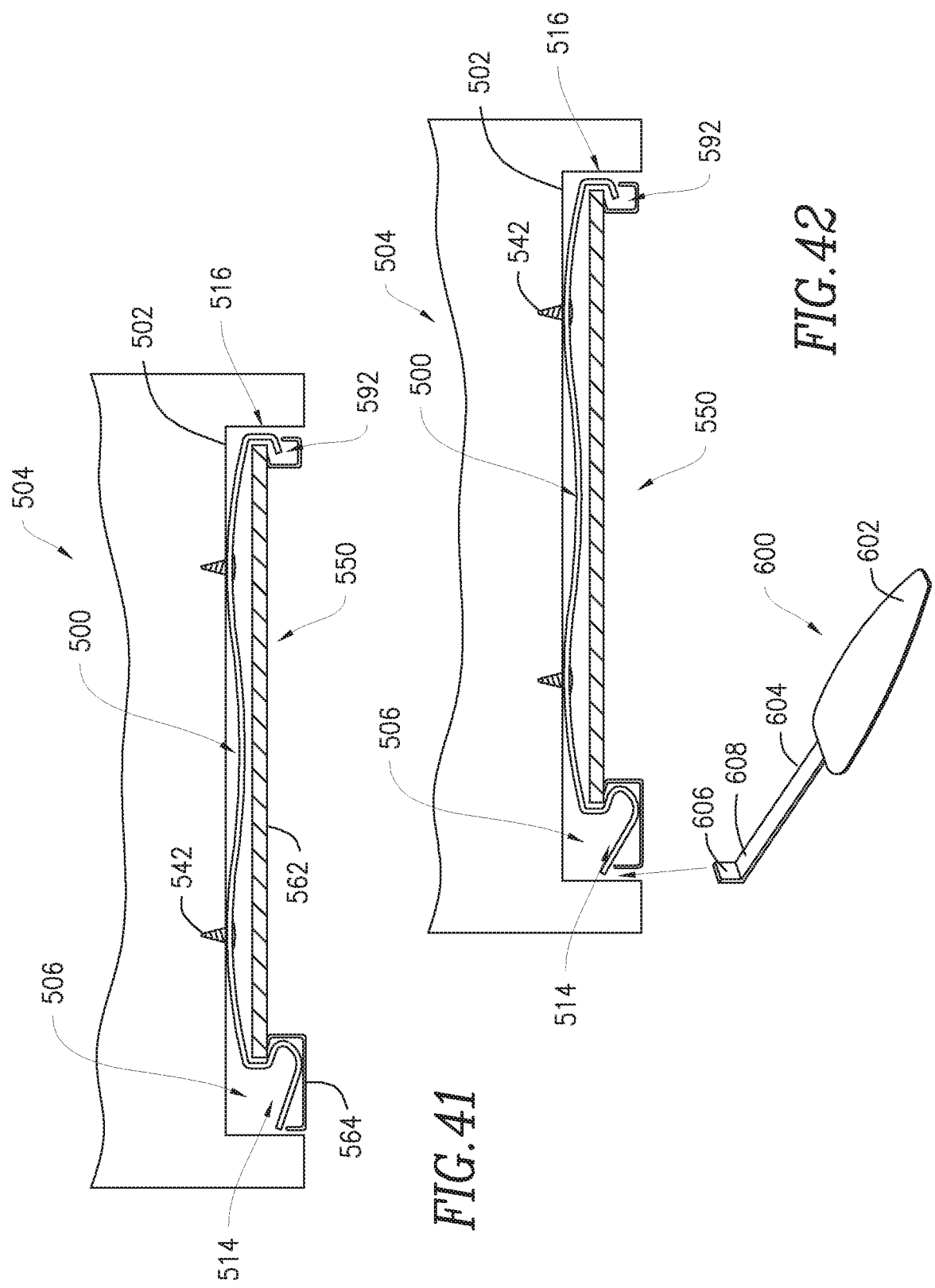

PANEL DEVICE AND METHOD OF MANUFACTURING

CROSS-REFERENCE TO RELATED APPLICATIONS

This application is a Continuation-In-Part application of, and claims priority to, U.S. Non-Provisional patent application Ser. No. 16/405,659, filed on May 7, 2019, which is a Continuation-In-Part application of, and claims priority to, U.S. Non-Provisional patent application Ser. No. 15/411,293, filed on Jan. 20, 2017, now U.S. Pat. No. 10,278,523 issued on May 7, 2019, which claims priority to U.S. Provisional Patent Application No. 62/280,913, filed on Jan. 20, 2016, the entire contents of the foregoing patent applications hereby expressly incorporated by reference.

BACKGROUND

Field of the Disclosure

The present disclosure relates to lighting units, more particularly lighting units having a lighting component that illuminates a product and/or provides ambient light. The present disclosure additionally relates to panel devices, and more particularly, to light panel devices and improved methods of manufacturing of such light panel devices.

Related Art

Shelving units are commonly used to display items, whether in commercial establishments or private residences. When multiple shelves are present, the presence of the shelving above the item commonly shields the item from light, making it more difficult to see the item being displayed.

The most common way of solving this issue is by use of lighting. Currently, spotlights are often used. When used with a glass shelves, light often does not reach the lower shelves, meaning that only items at or near eye level are usually seen. Furthermore, such lights have a limited diameter of light and thus will typically only light one item or a small number of items on the shelf, thereby requiring attachment of several different lighting units to the shelf above.

Furthermore, even without a shelf above an item, to properly light an item a lighting fixture must be attached to the wall or some other structure. Similarly, to increase the diameter of effective light of spotlights, the spotlights must be attached to some structure separate from the shelving units, such as a ceiling or wall. Even still, shadows and dark areas will still be present on the shelf.

Some display systems have used LED strips in cabinets, but this can cause each individual LED to be reflected in the product and take away from its look. Similar to the spotlight systems, shadows, dark areas, and bright spots are still an issue. During the manufacturing process of traditional lighting systems, molding a frame of one plastic material about a sheet of another plastic material can pose many challenges.

Wood and metal shelving have long been used, but such shelving units do not allow light through them and thus it is more difficult to light a product effectively.

Other prior attempts at a lit shelf have involved special hardware needed to install the shelf to the wall, or require separate power for each shelf, making it inefficient particularly for commercial display. It would be advantageous if there were a shelf that provided light while being installable in existing shelving systems, and allows the use of differently dimensioned shelves or a different number of shelves without the need for additional electrical infrastructure.

Lighting units positionable below other surfaces would also be desirable.

BRIEF DESCRIPTION OF THE DRAWINGS

The foregoing features of the disclosure will be apparent from the following Detailed Description, taken in connection with the accompanying drawings, in which:

FIGS. 18A-D are views of a mounting bracket;

FIG. 40 is a side view of installation of the light of FIG. 28 with to a mounting bracket of FIG. 20 within a recess of a cabinet;

FIG. 41 is a side view of the light of FIG. 28 installed with to a mounting bracket of FIG. 20 within a recess of a cabinet;

FIG. 42 is a side view of the light of FIG. 28, a mounting bracket of FIG. 20, and a removal tool;

SUMMARY

Figure 1:
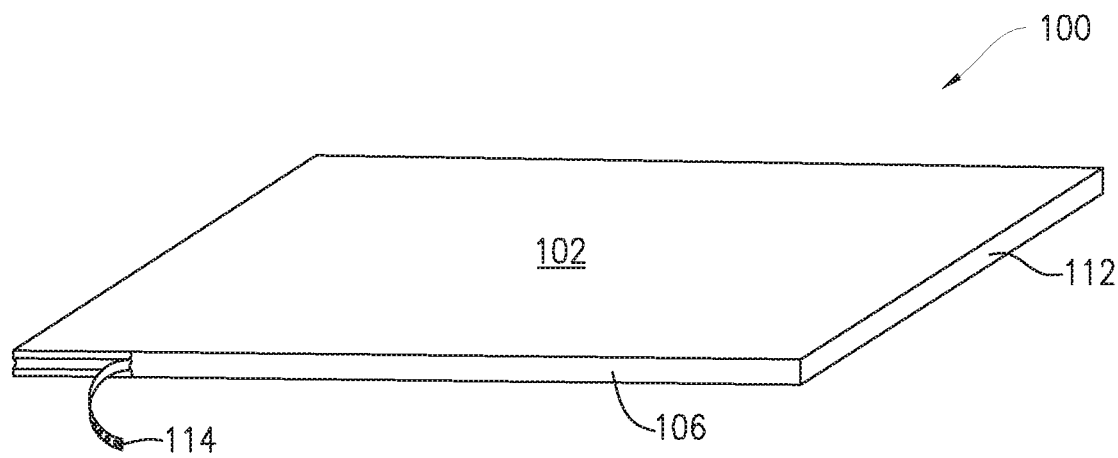
FIG. 1 is a top front perspective view of a self-lit fixed shelf.

The present disclosure relates to shelving units, more particularly shelving units having a lighting component that illuminates a product and/or provides ambient light.

According to some aspects of the present disclosure, the shelf could include a top side, a bottom side, a front side, a rear side, a left side, and a right side. The bottom side of the shelf is comprised of a material that is clear or sufficiently clear enough such that light travels through the shelf rather than experiencing significant distortion or scattering. The bottom side of the shelf could be altered such that the bottom side is transparent or translucent and the light could scatter evenly down.

The shelf includes a lighting strip along a side of the shelf. The lighting strip faces inward toward the shelf, sending the light through the shelf. The lighting strip could include light-emitting diodes. The top, front, back, and lateral sides of the shelf could be laminated to reflect the light downward. The lighting strip could have a female connector for connecting the lighting strip to a power supply. Additional connectors could be provided for supplying power to additional shelves.

According to further aspects of the present disclosure a surface mounted light for a shelf is provided. The light could be mounted to a desired surface (e.g., an underside of a wall-mounted shelf) using an adhesive or other suitable surface-mounting means. The light could have a top side, bottom side, front side, rear side, left side, and right side. The light can be formed from any material that is clear or sufficiently clear enough such that light provided by a lighting source, travels throughout the material without experiencing significant distortion or scattering. In order to diffuse light output, the bottom side could be altered such that the light is scattered evenly down.

The surface mounted light could include an LED lighting strip disposed along the front side of the light. The LED lighting strip could include white lights or a variety of shades of white, and/or a combination of colors. The light could include a female connector at a rear corner and/or side of the light where a power supply or an additional light unit could be connected.

The surface mounted light could have a front groove (e.g., chamfer) along a top front edge thereof. The LED light strip could be secured in the front groove such as by using a suitable adhesive or otherwise. The female power connector can be affixed to the light in a variety of different positions. The top side of the light can be laminated to reflect the light downward.

According to further aspects of the invention, a lighted floating shelf is provided. The floating shelf could include a bottom layer having a groove along an edge for receiving a lighting strip. A top layer could be positioned over the bottom layer, with one or more spacers therebetween. The top layer, bottom layer, and spacers could define a pocket therebetween. A power jack could be positioned on an inner surface of one of the spacers, and electrical wiring could be fed through the spacer to the lighting strip. The floating shelf could include a mounting groove which extends laterally between the left and right sides of the floating shelf. The profile of the mounting groove could be sized and shaped to receive and mate with a wall mounting bracket.

According to still further aspects of the present disclosure, a mounting bracket is provided to attach a lighted floating shelf to a wall. The mounting bracket could include a wall harness, hinge, and support rod. The wall harness can be mounted to a wall (e.g., using screws, etc.) on top of an existing standard electrical outlet. The electrical outlets can be accessed through apertures in the wall harness. The wall harness could include a back plate, a lower bracket, and an upper bracket.

The hinge can include a fixed portion and a movable portion. The movable portion can be provided with a threaded aperture for receiving a threaded portion of support rod. The support rod could be provided with the threaded portion on a first end and could have a bumper (e.g., rubber foot) on the opposite end. An angle between the rotatable and fixed portions of the hinge can be adjusted by rotating the support rod. When assembled, the fixed portion of the hinge may be slidably movable parallel to, and along, the back plate.

A lighted floating shelf could be mounted on the mounting bracket. In order mount the floating shelf onto the mounting bracket, the mounting bracket is positioned in the pocket, the upper bracket is received in the mounting groove of the floating shelf, and the support rods are frictionally engaged with the top layer of the floating shelf.

According to still further aspects of the present disclosure, a mountable light is provided. The mountable light includes a light panel formed from an at least partially transparent material and having a first groove on an edge. The first groove extends a partial distance into the light panel. The mountable light includes a lighting strip positioned within the first groove, and a first power connector positioned on a side of the light panel and configured to provide power to the lighting strip. The mountable light includes a reflective laminate adhered to top, front, rear, and lateral sides of the light panel.

The lighting strip can be positioned to face towards a rear side of the light panel. The light panel can be fabricated from a single piece of material with the first groove formed in the single piece of material. The lighting strip can include a plurality of light-emitting diodes. The reflective laminate can be any light colored reflective material such as white formica. A bottom surface of the light panel can be altered to evenly scatter light from the lighting strip. The light panel can be altered by abrasion.

The mountable light can include second and third grooves formed on the lateral sides of the light panel, the first and second grooves extending a partial distance into the light panel. The second and third grooves can connect to the first groove on opposing sides of the light panel to form a continuous groove along the front edge and lateral sides of the light panel. The mountable light includes a frame disposed around and engaged with the light panel. The frame includes a channel formed therein and extending around the light panel. The first groove can define a semi-circular configuration.

According to still further aspects of the present disclosure, a mounting bracket for mounting the mountable light is provided. The mounting bracket includes an elongated body portion defining a central portion, a proximal end, and a distal end. The mounting bracket includes a first fixation portion extending from the proximal end of the elongated body portion, the first fixation portion extending partially over the elongated body portion and flexibly disposed relative to the elongated body portion. The mounting bracket includes a second fixation portion extending from the distal end of the elongated body portion, the second fixation portion extending partially over the elongated body portion and towards the first fixation portion.

The first fixation portion can define a substantially S-shaped configuration. The mounting bracket can include a first groove formed between the first fixation portion and the elongated body portion, and a second groove formed between the second fixation portion and the elongated body portion. The first and second grooves can be disposed on opposing sides of the elongated body portion and can each be configured to receive therein an edge of a light panel. The mounting bracket can include a first set of holes formed in the elongated body portion and disposed adjacent to the first fixation portion, and a second set of holes formed in the elongated body portion and disposed adjacent to the second fixation portion.

According to still further aspects of the present disclosure, a light mounting system is provided. The system includes a mounting bracket configured to be fixed to a bottom surface of a cabinet. The mounting bracket includes an elongated body portion defining a central portion, a proximal end, and a distal end. The mounting bracket includes a first fixation portion extending from the proximal end of the elongated body portion. The mounting bracket includes a second fixation portion extending from the distal end of the elongated body portion. The system includes a mountable light detachably coupled to the mounting bracket. The mountable light includes a light panel formed from an at least partially transparent material and having a first groove on an edge, the first groove extending a partial distance into the light panel. The mountable light includes a lighting strip positioned within the first groove, and a first power connector positioned on a side of the light panel and configured to provide power to the lighting strip. The mountable light includes a reflective laminate adhered to top, front, rear, and lateral sides of the light panel.

The first fixation portion can extend partially over the elongated body portion and can be flexibly disposed relative to the elongated body portion. The first fixation portion can be configured to be at least partially inserted into a channel formed in a frame surrounding the light panel of the recess mounted light. The second fixation portion can extend partially over the elongated body portion and towards the first fixation portion. The second fixation portion can be configured to be at least partially inserted into a channel formed in a frame surrounding the light panel of the recess mounted light.

DETAILED DESCRIPTION

The present disclosure relates to a self-lit shelving unit, and a lighting unit as discussed in detail below.

Figure 2:
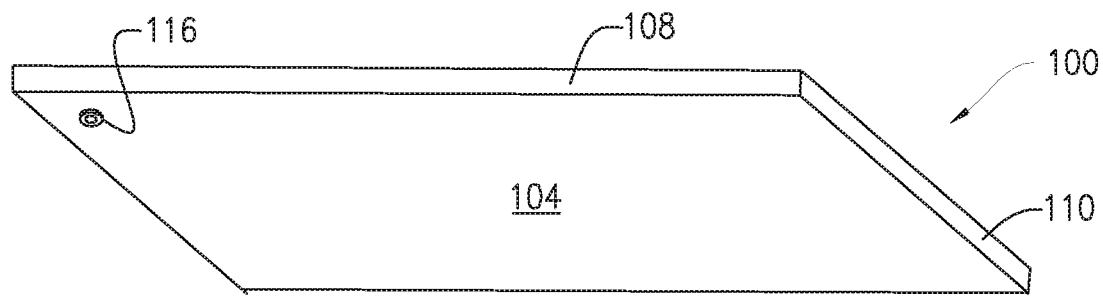
FIG. 2 is a rear back perspective view of the self-lit fixed shelf of FIG. 1.
Figure 3:
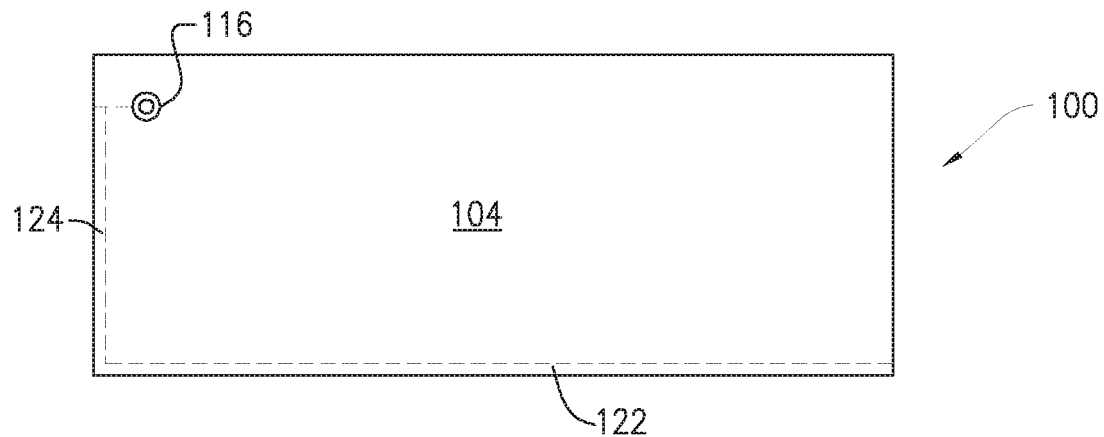
FIG. 3 is a bottom view of the self-lit fixed shelf of FIG. 1.
Figure 4:
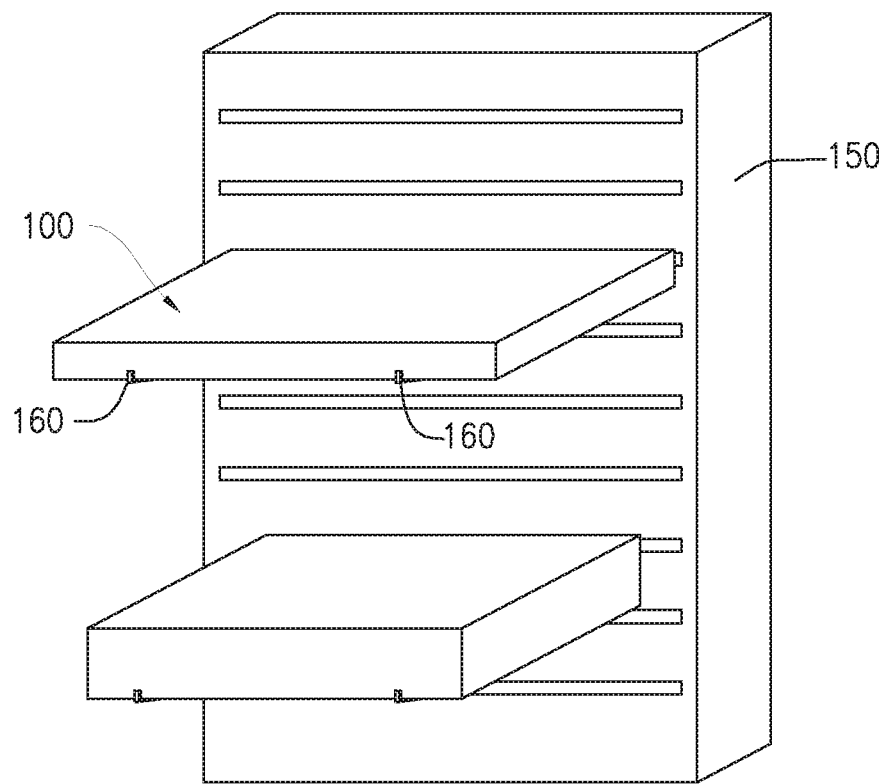
FIG. 4 is a top front perspective view of the self-lit fixed shelf of FIG. 1 mounted to a wall unit using mounting brackets.
Figure 5:
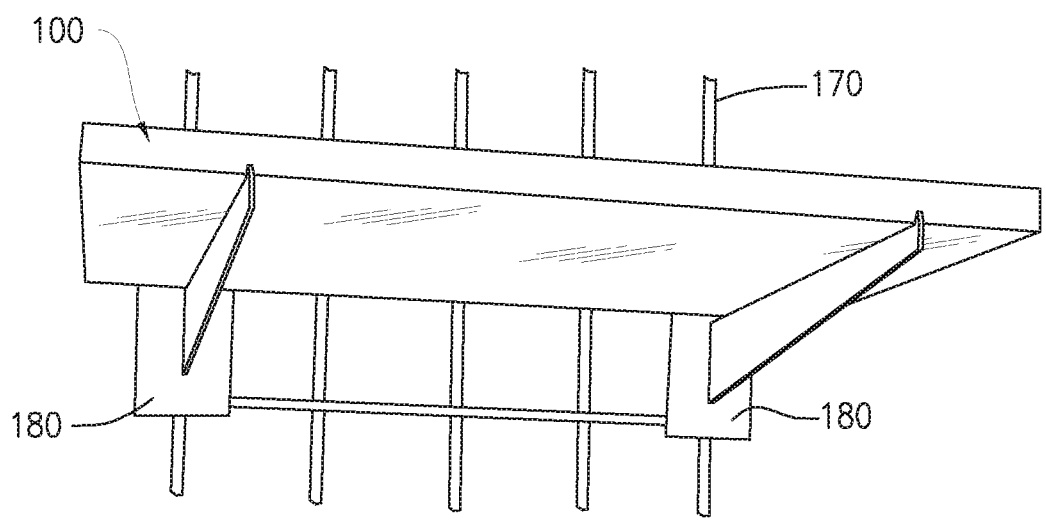
FIG. 5 is a top bottom perspective view of the self-lit fixed shelf of FIG. 1 mounted to a wall unit using mounting brackets.

FIGS. 1-5 are views of a self-lit fixed shelf 100. More specifically, FIG. 1 is a top front perspective view of a self-lit fixed shelf 100, FIG. 2 is a rear back perspective view of the self-lit fixed shelf 100 of FIG. 1, FIG. 3 is a bottom view of the self-lit fixed shelf 100 of FIG. 1, FIG. 4 is a top front perspective view of the self-lit fixed shelf 100 of FIG. 1 mounted to a wall unit 150 using mounting brackets 160, and FIG. 5 is a top bottom perspective view of the self-lit fixed shelf 100 of FIG. 1 mounted to a wall unit 170 using mounting brackets 180.

The shelf 100 could be rectangular or any other suitable shape (e.g., trapezoidal, square, triangular) of any geometry (e.g., having an arced front side). For example, as shown in FIGS. 1 and 2, the shelf 100 could include a top side 102, a bottom side 104, a front side 106, a rear side 108, a left side 110, and a right side 112. The shelf 100 could have any suitable thickness depending on the support requirements of the shelf and/or the dimensions of the mounting unit, depending on needs of the user. For example, the shelf 100 could be about 0.5 inches thick, about 0.75 inches thick, etc.

The bottom side 104 of the shelf 100 is comprised of a material that is clear or sufficiently clear enough such that light travels through the shelf 100 rather than experiencing significant distortion or scattering. The bottom side 104 of the shelf 100 could be altered (e.g., sand blasted, roughened with sandpaper, etc.) such that the bottom side 104 is transparent or translucent and the light could scatter evenly down. For example, the shelf 100 could be made of acrylic, fiberglass, polyurethane, and/or other plastics or materials of sufficient durability and clarity.

The self-lit shelf 100 includes a clear or substantially clear bottom side 104 with an LED lighting strip 114 along a front side 106 of the shelf 100. The LED lighting strip 114 faces inward toward the shelf 100, sending the light through the shelf 100 itself. The top side is laminated with white laminate (e.g., formica), facing down to reflect the light downward and the front side 106, rear side 108, left side 110, and right side 112 are laminated with another laminate. The LED lighting strip 114 could include white lights or a variety of shades of white, and/or a combination of colors (e.g., red, green, blue, etc.), which in combination can give white light or can separately be used to create color effects.

The LED strip 114 has at least one female connector or jack 116 (e.g., 5.5 mm direct current (DC) connector) at each rear corner and/or side of the shelf 100 (see, for example, FIGS. 2 and 3) where a power supply (not shown) could be connected. The connector 116 could utilize any suitable connection type (e.g., 5.5 mm jack, push-in wire connector, etc.) for connecting the LED strip 114 to the power supply. The jack 116 (e.g., 5.5 mm jack) could connect to the jack (e.g., 5.5 mm jack) of another shelving unit, thereby allowing for an expandable system. These connectors 116 (e.g., 5.5 mm connectors) also allow for other shelves to be connected to the shelf 100, allowing several shelving units to be continuous and to operate off of one cord and/or power source, thereby reducing the number of cords or other infrastructure needed to operate a bank of shelves.

Because the strip of LED lights 114 does not add significant bulk to the profile or thickness of the shelf 100, the shelf 100 can be used with many standard shelving systems to replace existing shelves without the need for special hardware in installation. In particular, a system wherein the shelf 100 slides into a slot can be used with the inventive shelf 100. Because no special hardware is needed, the shelf 100 offers a significant advantage over other shelves in ease of installation and less disruption to the retail outlet, as a shelf installation does not necessarily need to be entirely removed in order to use the shelf 100.

A variety of different power sources could be used with the shelf 100. For example, a typical cord with an AC power outlet connection can be used to supply power, a battery, etc. The shelf 100 can be used with preexisting hardware and infrastructure, including to power the lighting of the shelf 100.

The shelf 100 can be set up as a stand-alone unit to attract attention to a particular item in a retail location, or the entire retail location can be provided with shelves 100. The lighting provided by shelf 100 may be sufficient to provide ambient light to the location, particularly when shelf 100 is used throughout a location. Even a single unit of shelf 100 would ensure that the eye is attracted to the items for sale. Shelf 100 can also be used in a residential setting for display of items. One of skill in the art can conceive of numerous other uses for shelf 100 as well as those already discussed.

Figure 16:
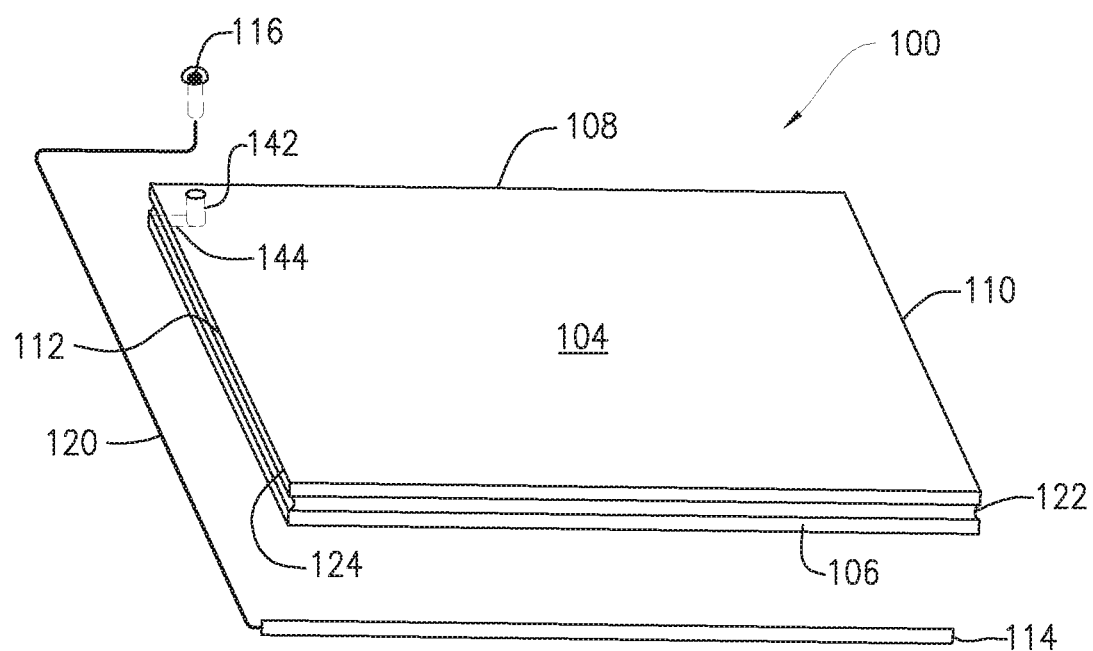
FIG. 16 is a partial bottom exploded view of the self-lit fixed shelf of FIG. 1.
Figure 17:
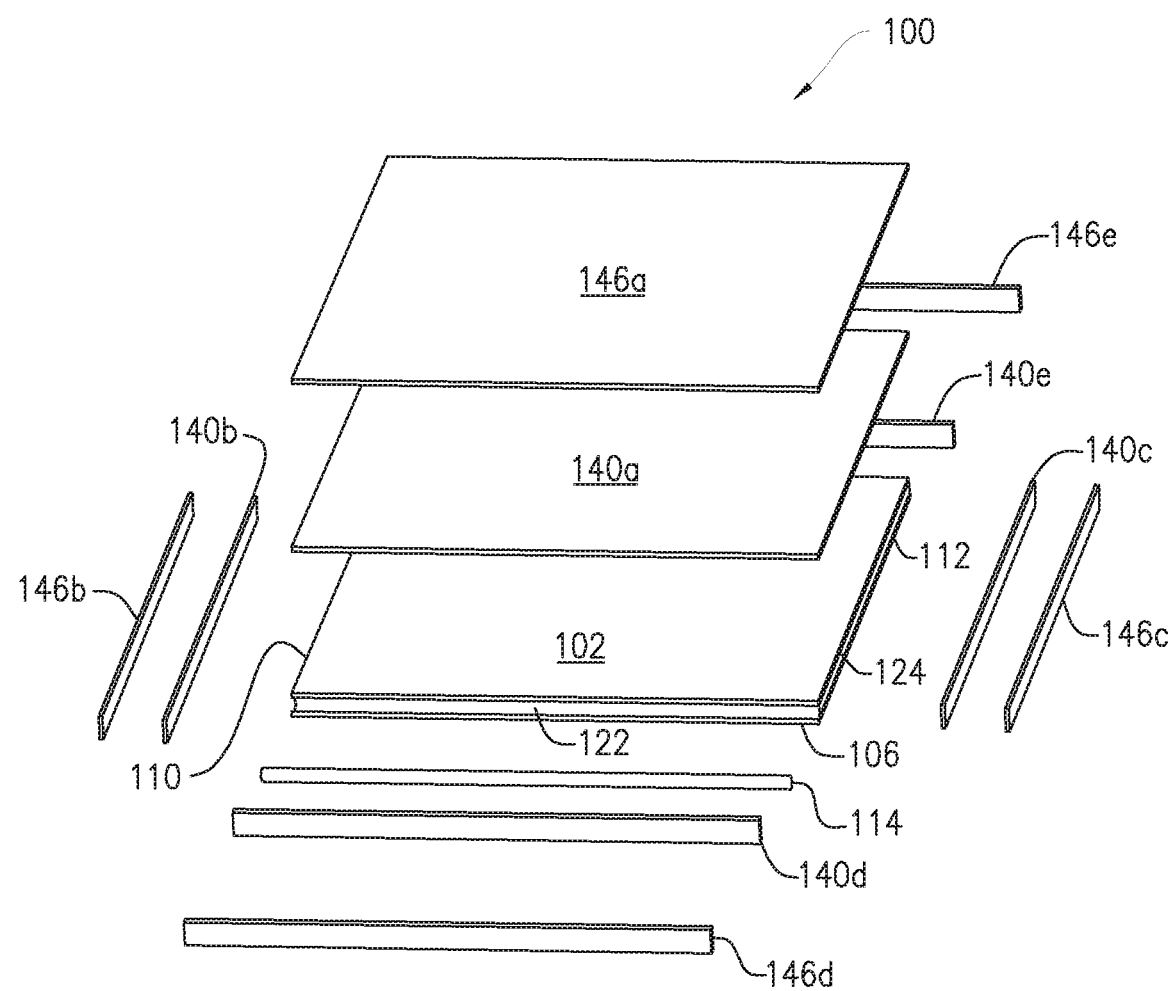
FIG. 17 is a partial top exploded view of the self-lit fixed shelf of FIG. 1.

The shelf 100 could use an acrylic "p95" material with a ¼" wide×⅛" deep groove 122, 124 cut into the front side 106 and left and right sides 110, 112 and have a flame polished bottom surface. The LED light 114 could be a 5630 smd LED—white, 38 lm per LED, 60 LEDs per meter, or a 2835 smd LED—white, 120 LEDs per meter, on a 6 mm pcb strip, or any other suitable lighting strip, glued into the front groove 122 facing inwards. According to some aspects of the present disclosure, the LED light strip 114 could be affixed within the groove 122 using a double-sided bonding tape, such as for example, VHB™ adhesive acrylic tape manufactured by the 3M™ Company, or any other suitable double-sided bonding tape or adhesive. As shown in FIGS. 3 and 16, the LED light strip 114 could be glued into the front groove 122 with the supply wire 120 running along the side groove 124 to the 5.5 mm jack 116. As shown in FIG. 17, the shelf 100 could be covered with two (2) layers of laminate; one layer of white color facing inwards to assist in the reflection of the light, and one layer facing outwards in the desired finish color, and/or covered with a 3 mm thick white pvc edgebanding.

As shown in FIGS. 4 and 5, the fixed shelf 100 could rest on top of mounting brackets 160, 180 or any other mounting structure. For example, the fixed shelf 100 could rest on top of brackets, pegs, support strips, etc.

Figure 6:
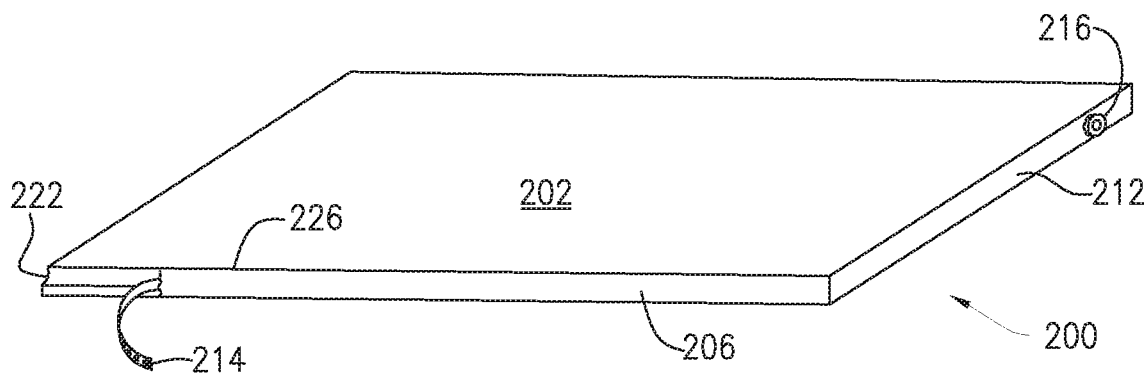
FIG. 6 is a top front perspective view of a surface mounted light.
Figure 7:
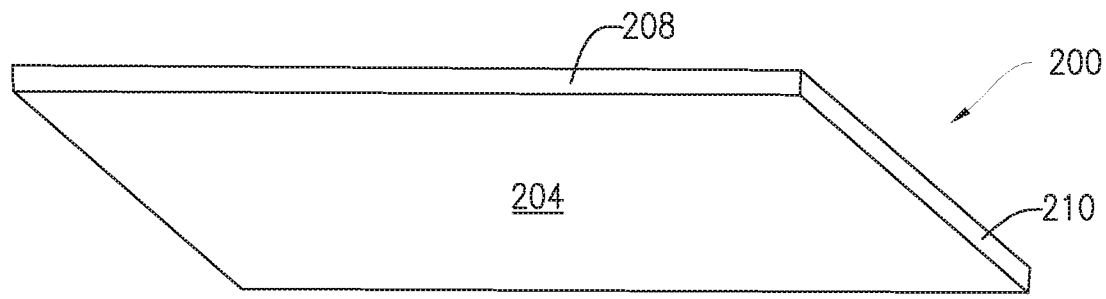
FIG. 7 is a rear back perspective view of the surface mounted light of FIG. 6.
Figure 8:
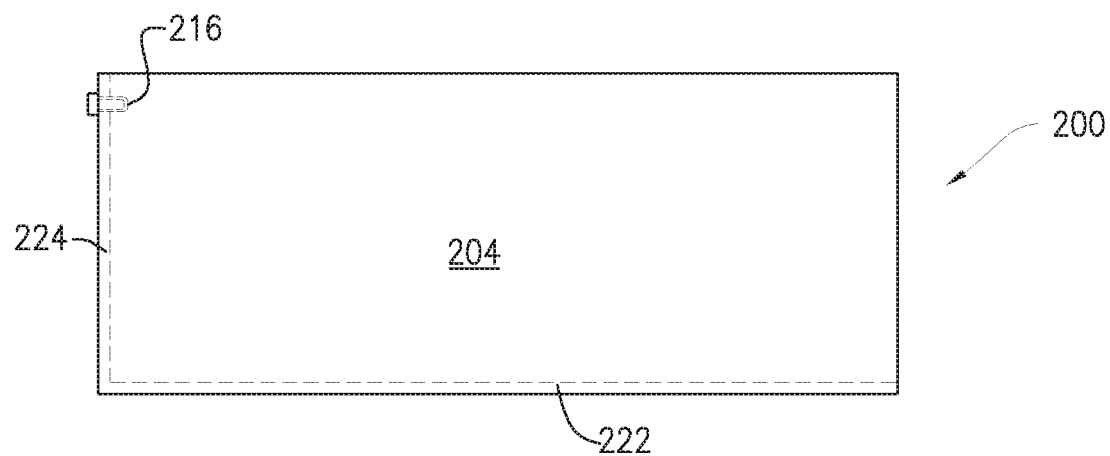
FIG. 8 is a bottom view of the surface mounted light of FIG. 6.

FIGS. 6-8 are views of a surface mounted light 200 for a shelving unit. More specifically, FIG. 6 is a top front perspective view of a surface mounted light 200, FIG. 7 is a rear back perspective view of the surface mounted light 200 of FIG. 6, and FIG. 8 is a bottom view of the surface mounted light 200 of FIG. 6. The surface mounted light 200 includes the same features and/or materials as the fixed shelf described in FIGS. 1-5, except where otherwise noted.

The surface mounted light 200 could be thinner and lighter than the fixed shelf 100 of FIGS. 1-5. The surface mounted light could be mounted (e.g., by an adhesive) to a bottom surface (e.g., of a shelf, of a cabinet, etc.).

As shown in FIGS. 6-8, the surface mounted light 200 has a top side 202, bottom side 204, front side 206, rear side 208, left side 210, and right side 212. The surface mounted light 200 can be formed from any material that is clear or sufficiently clear enough such that light provided by light source 214, for example, an LED lighting strip (discussed hereinbelow) travels throughout the material without experiencing significant distortion or scattering. For example, the light 200 could be made of acrylic, fiberglass, polyurethane, or any other material of sufficient durability and clarity. In order to diffuse the light output of light 200, the bottom side 204 of the light 200 could be altered (e.g., sand blasted, roughened with sandpaper, etc.) such that the bottom side 204 is transparent or translucent, such that the light is scattered evenly down from the light 200.

The light 200 could include an LED lighting strip 214 disposed along the front side 206 of the light 200. The LED lighting strip 214 faces inward (e.g., toward the center of the light 200), thereby transmitting the light provided by the lighting strip 214 through the light 200 itself. The LED lighting strip 214 could be a 5630 smd LED (e.g., white, 38 lm per LED, 60 LEDs per meter on a 6 mm pcb strip), a 2835 smd LED (e.g., white, 120 LEDs per meter), or any other suitable lighting strip. The LED lighting strip 214 could include white lights or a variety of shades of white, and/or a combination of colors (e.g., red, green, blue, etc.), which in combination can provide white light or can be used separately to create color effects. As shown in FIGS. 6 and 8, the LED lighting strip 214 could include at least one female connector jack 216 (configured to receive a male connector jack of a power supply) and a supply wire (not shown), or the light strip 214 could otherwise be connected to a power supply.

According to some aspects of the present disclosure, the LED light strip 214 could include additional female connectors 216 at each rear corner and/or side of the light 200 where a power supply or an additional light unit could be connected. Further the connectors 216 could be configured to accept power from a power supply, and/or to provide power to an additional light 200. For example, a first female connector 216 could be coupled to a DC power supply and a second female connector 216 could be used to provide power to another light (e.g., by way of an intermediary cable), thereby allowing for an expandable system. Accordingly, the connectors 116 could allow for additional lights to be connected to the light 200, allowing multiple units to be continuous and to operate off of a single power source (e.g., daisy chaining), thereby reducing the number of cords or other infrastructure needed to operate numerous lights 200.

According to some aspects of the present disclosure, the light 200 could have a front groove 222 (e.g., chamfer) along a top front edge 226 thereof. The LED light strip 214 could be glued into the front groove 222 using a suitable adhesive, and the supply wire could be run along a side groove 224 to the female power connector 216. According to some aspects of the present disclosure, the LED light strip 214 could be affixed within the groove 222 using a double-sided bonding tape, such as for example, VHB™ adhesive acrylic tape manufactured by the 3M™ Company, or any other suitable double-sided bonding tape or adhesive. Of course, in embodiments where the light 200 has multiple connectors 216, multiple grooves 222 could be provided (e.g., a side groove 224 on each of the left and right sides of the light 200) to accept additional supply wires.

The female power connector 216 can be affixed to the light 200 in a variety of different positions. For example, as shown in FIGS. 6 and 8, the connector 216 could be mounted so that it is accessible from a side (e.g., right side 212) of the light 200. Alternatively, the connector could be mounted so that it is accessible from a different side (e.g., bottom side 204) of the light 200. According to some aspects of the present disclosure, the connector 216 could be mounted at one or more rear corners of the light 200 (see FIGS. 6 and 8).

The top side of the light 200 is laminated with white laminate (e.g., formica), facing down to reflect the light downward and the front side 106, rear side 108, left side 110, and right side 112 could be laminated with another laminate.

Figure 9:
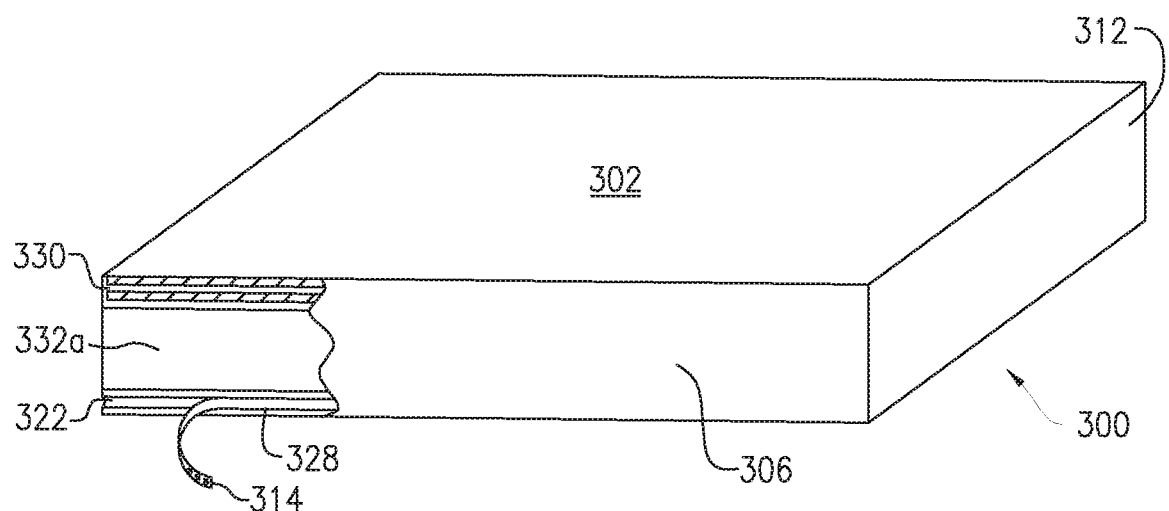
FIG. 9 is a top front perspective view of a self-lit floating shelf.
Figure 10:
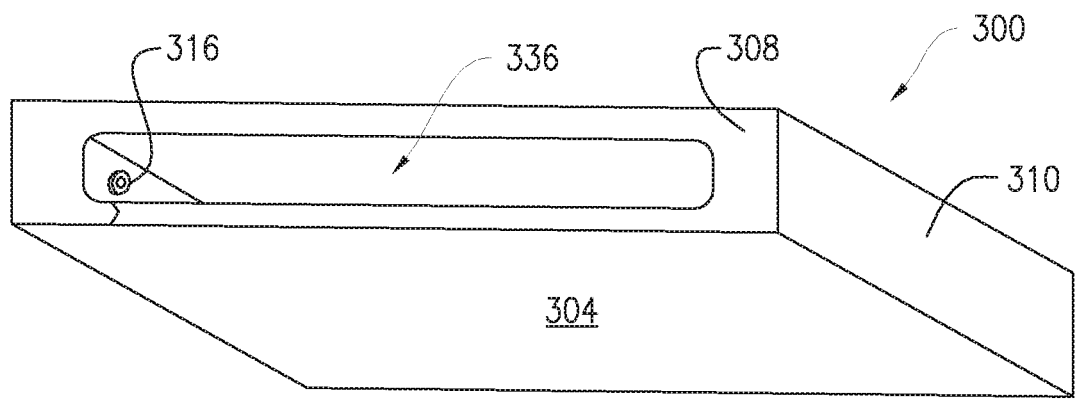
FIG. 10 is a rear back perspective view of the self-lit floating shelf of FIG. 9.
Figure 11:
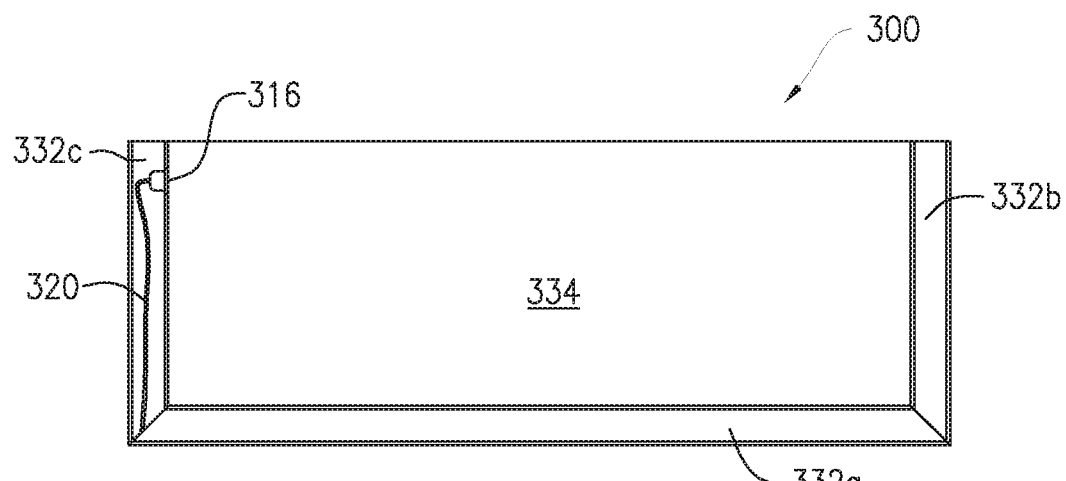
FIG. 11 is a bottom view of the self-lit floating shelf of FIG. 9.
Figure 12:
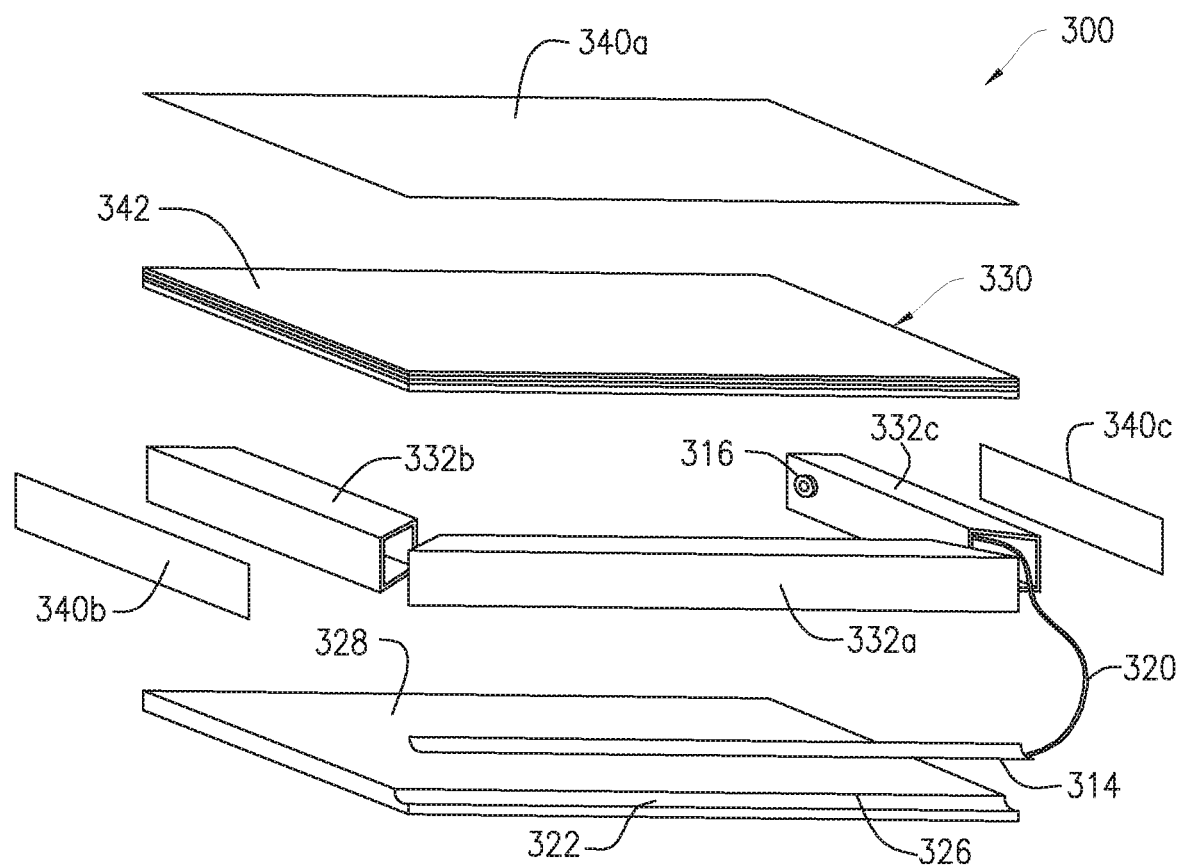
FIG. 12 is an exploded view of the self-lit floating shelf of FIG. 9.
Figure 13:
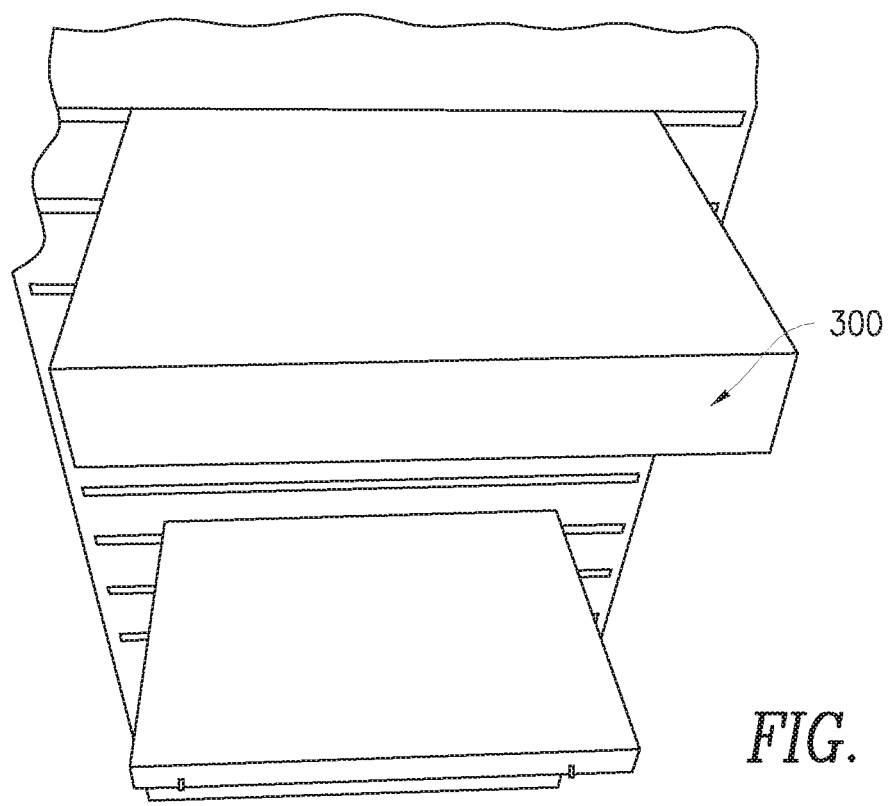
FIG. 13 is a front perspective view of the self-lit floating shelf of FIG. 9 mounted to a wall unit.
Figure 14:
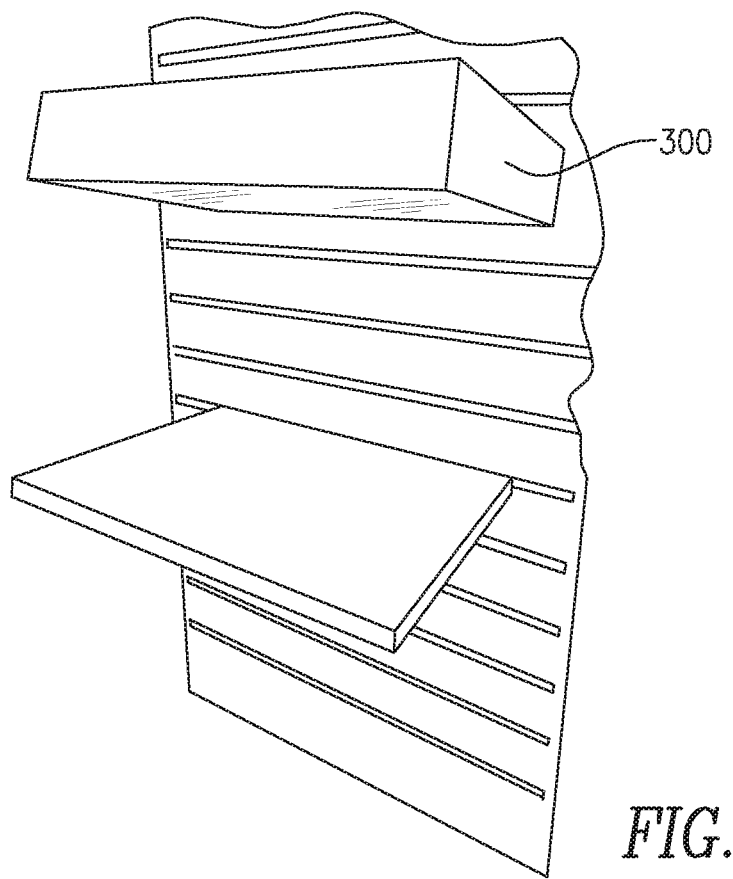
FIG. 14 is another perspective view of the self-lit floating shelf of FIG. 13.
Figure 15:
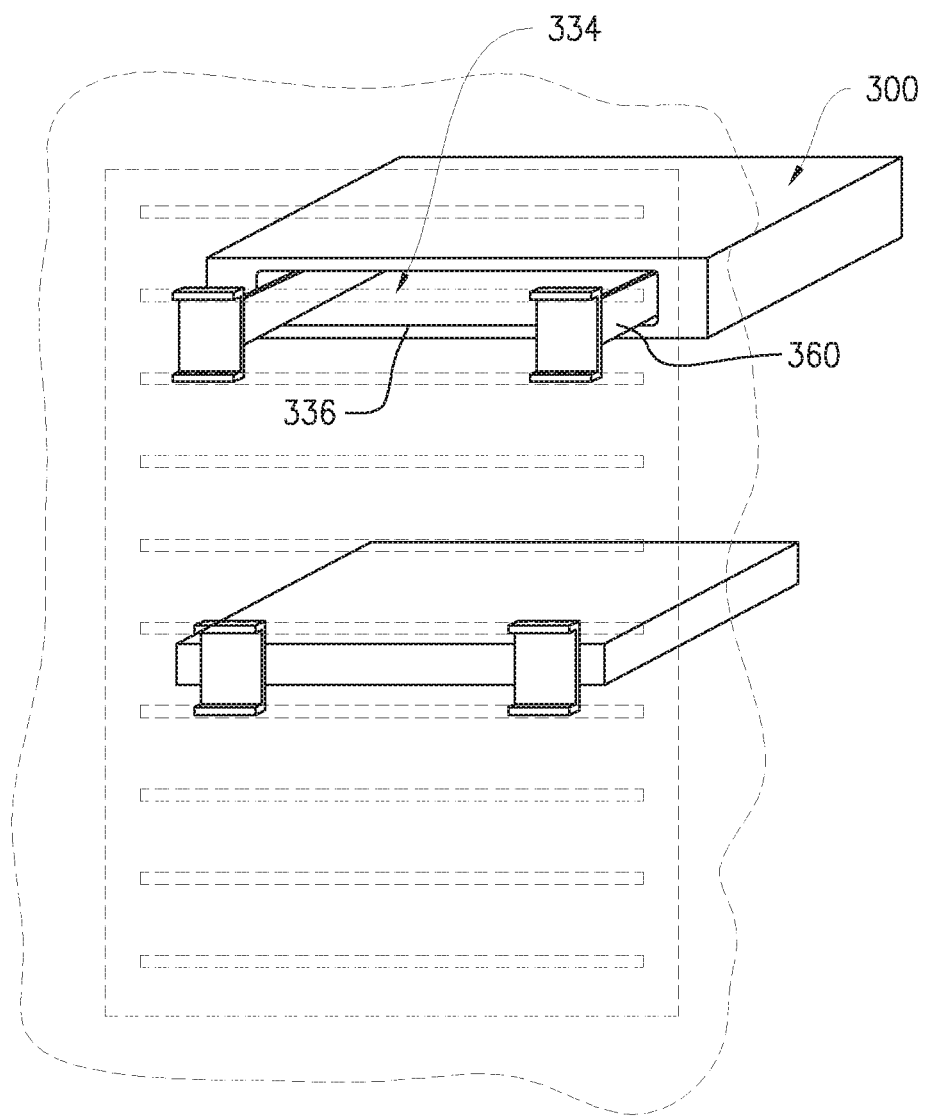
FIG. 15 is a perspective view of the self-lit floating shelf of FIG. 13 being assembled to the wall unit.

FIGS. 9-15 are views of a self-lit floating shelf 300. More specifically, FIG. 9 is a top front perspective view of a self-lit floating shelf 300, FIG. 10 is a rear back perspective view of the self-lit floating shelf 300 of FIG. 9, FIG. 11 is a bottom view of the self-lit floating shelf 300 of FIG. 9, FIG. 12 is an exploded view of the self-lit floating shelf 300 of FIG. 9, FIG. 13 is a front perspective view of the self-lit floating shelf 300 of FIG. 9 mounted to a wall unit, FIG. 14 is another perspective view of the self-lit floating shelf 300 of FIG. 13; and FIG. 15 is a perspective view of the self-lit floating shelf 300 of FIG. 13 being assembled to the wall unit. The floating shelf 300 includes the same features and/or materials as the fixed shelf described in FIGS. 1-5, except where otherwise noted. For example, the floating shelf 300 could include a top side 302, a bottom side 304, front side 306, left side 310, and right side 312.

The floating shelf 300 could include a bottom layer 328 of clear Plexiglas (e.g., acrylic) having a groove 322 (e.g., or chamfer) along a top front edge 326 thereof. Groove 322 could receive LED strip 314. According to some aspects of the present disclosure, the LED light strip 314 could be affixed within the groove 322 using a double-sided bonding tape, such as for example, VHB™ adhesive acrylic tape manufactured by the 3M™ Company, or any other suitable double-sided bonding tape or adhesive. A top layer 330 of plywood (e.g., ½ inch) could be positioned over the bottom layer, with one or more spacers 332a-c therebetween. The spacers 332a-c could be aluminum tubing, such as square aluminum tubing (e.g., 1.5 inches). The spacers could be positioned along the front, left, and right edges of the top and bottom layers, thereby defining a pocket 334 and rear opening 336 (see FIG. 15) therebetween. A power jack 316 could be positioned on an inner front surface 338 of one of the spacers 332a-c, and electrical wiring 320 could be fed through the spacer 332a-c to the LED strip 314. Additionally, a laminate 340a-c could be positioned on a top surface 342 of the top layer 330, a left surface of a left spacer 332b, and a right surface of a right spacer 332c.

The floating shelf 300 includes a pocket 334 having an opening 336 in a back side 308 of the floating shelf 300. The pocket 334 receives mounting brackets 360 (or other mounting components) to hide the mounting components 360 therein.

FIGS. 16 and 17 are perspective views of the self-lit fixed shelf 100 shown in FIGS. 1-3. More specifically, FIG. 16 is a partial bottom exploded view of the self-lit fixed shelf 100, and FIG. 17 is a partial top exploded view of the self-lit fixed shelf 100.

As shown in FIGS. 16 and 17, the shelf 100 could include top side 102, bottom side 104, front side 106, rear side 108, left side 110, and right side 112. The self-lit shelf 100 includes an LED lighting strip 114 along a front side 106 of the shelf 100. A female connector 116 for receiving power from a power source (not shown) is coupled to the LED lighting strip 114 by way of a supply wire 120. As shown in FIG. 16, the shelf 100 could be provided with a groove 122 in the front side 106 of the shelf for receiving the LED light strip 114. The shelf 100 could also be provided with a groove 124 on at least one side (e.g., left side 110 and/or right side 112) of the shelf 100 to receive the supply wire 120. According to some aspects of the present disclosure, a first aperture 142 for receiving the female power connector 116 is disposed in the bottom side 104 of the shelf 100 and a second aperture 144 is disposed on at least one side (e.g., left side 110 and/or right side 112) of the shelf 100, so that the first and second apertures 142, 144 intersect. Accordingly, the supply wire 120 can be run along groove 124 and through aperture 144 so that the supply wire 120 can couple the LED lighting strip 114 to the female connector 116 without disturbing the external appearance of the shelf 100. The first and second apertures could at one, or any/all, corner(s) of the shelf 100.

As shown in FIG. 17, one or more of the top side 102, front side 106, rear side 108, left side 110, and right side 112 of shelf 100 could be laminated. For example, the sides could be laminated with a white laminate 140a-e (e.g., formica) which faces inward (e.g., towards a center of the shelf 100) and assists in reflection of light. Additionally, the shelf 100 could be provided with a second layer of laminate 146a-e which is disposed on top of the first layer of laminate 140a-e. The second layer of laminate 146a-e could provide the desired finish and color (e.g., 3 mm thick white PVC edgebanding).

FIGS. 18A-D show a mounting bracket 460 according to another aspect of the present disclosure. More specifically, FIG. 18A is a perspective view of the mounting bracket 460, FIG. 18B is a perspective view of a wall harness 462 of the mounting bracket 460, FIG. 18C is a cross-sectional view of the wall harness 462, and FIG. 18D is a perspective view of a hinge 464 and support rod 466 of the mounting bracket 460.

Figure 19A:
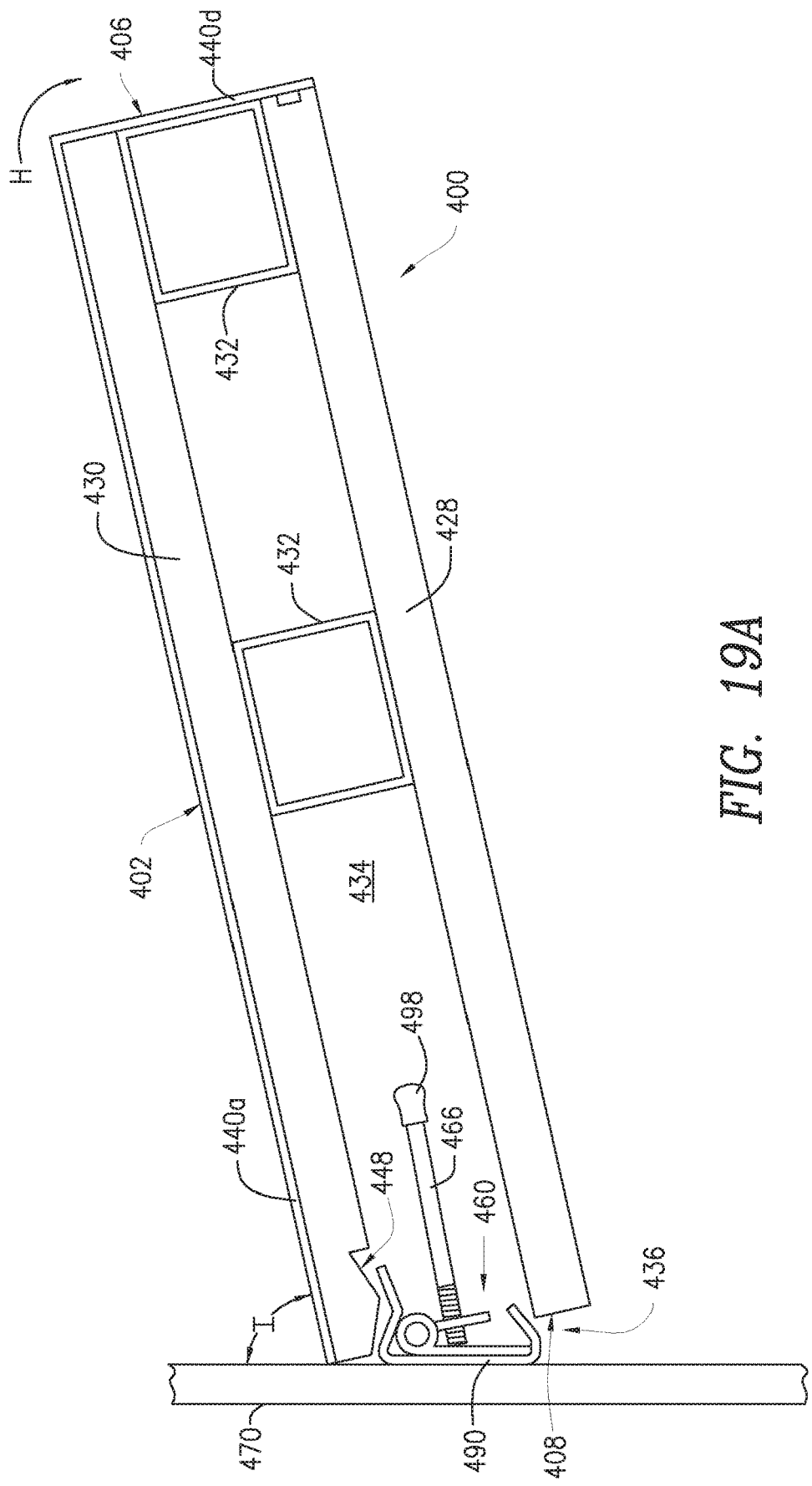
FIGS. 19A and 19B are cross-sectional views of a floating shelf mounted to a wall using the mounting bracket of FIGS. 18A-D.

Mounting bracket 460 can be used to attach floating shelf 400 to a wall 470 (see FIGS. 19A and B). Mounting bracket 460 includes wall harness 462, hinge 464, and support rod 466. As shown in FIG. 18B, wall harness 462 is provided with a plurality of apertures 468 configured to receive a pair of standard electrical outlets 472. Accordingly, the wall harness 462 can be mounted to a wall 470 (e.g., using screws or the like) on top of an existing standard electrical outlet 472. Importantly, the electrical outlets 472 can be accessed through the apertures 468 when the mounting bracket is fully assembled and the outlets 472 can be positioned anywhere along the length of the bracket. The wall harness 462 could be made from a single piece of sheet metal or from a plurality of components. The wall harness includes a back plate 474, a lower bracket, indicated generally at 476, extending from a bottom edge of the back plate 474, and an upper bracket, indicated generally at 478, extending from a top edge of the back plate. The lower bracket 476 can include first portion 486 which extends from the bottom edge of the back plate 474 and a second portion 488 which extends at an angle from the first portion 486. The upper bracket 478 can include first portion 482 which extends from the top of the back plate 474 and a second portion 484 which extends at an angle from the first portion 482.

FIG. 18C shows a configuration of wall harness 462 according to some aspects of the present disclosure. First portion 482 and second portion 484 of upper bracket 478 could form an angle relative to each other (e.g., about 120 degrees) as indicated by arrow A, first portion 482 of upper bracket 478 and back plate 474 could form an angle relative to each (e.g., about 60 degrees) other as indicated by arrow B, back plate 474 and first portion 486 of lower bracket 476 could form an angle relative to each other (e.g., about 90 degrees) as indicated by arrow C, and first portion 486 and second portion 488 of lower bracket 476 could form an angle relative to each other (e.g., about 135 degrees) as indicated by arrow D.

FIG. 18D shows hinge 464 and support rod 466 of mounting bracket 460. Hinge 460 can include a fixed portion 490 and a rotatable portion 492. Rotatable portion 492 can be provided with a threaded aperture 494 for receiving a threaded portion 496 of support rod 466. Support rod 466 is provided with the threaded portion 496 on a first end and could have a bumper 498 (e.g., rubber foot) on the opposite end. When the threaded portion 496 of the support rod 466 is threaded into the aperture 494, the end of support rod 466 that is proximate to the threaded portion 496 will bear against fixed portion 490 (e.g., due to gravity). The support rod 466 can be further advanced through the rotatable portion 492 by rotating support rod in the direction indicated by arrow E (e.g., clockwise about its axis). Conversely, the support rod 466 can be removed from the rotatable portion 492 by rotating support rod 466 opposite the direction indicated by arrow E (e.g., counterclockwise about its axis). Accordingly, as the support rod 466 is rotated, rotatable portion 492 of hinge 464 is rotated about the axis indicated by arrow F and the smallest permitted angle between fixed portion 490 and rotatable portion 492, indicated by arrow G, is altered. The amount of rotation of the support rod 466 could be limited by use of a collar (e.g., a hexagonal nut) disposed around the threaded portion 496 of the support rod 466 at a predetermined location, thereby limiting mobility of the rotatable portion 492 of the hinge 464. According to some aspects of the present disclosure, the collar (e.g., hexagonal nut) disposed around the threaded portion 496 could be sized and shaped to provide additional grip (e.g., as compared to a threaded portion 496 having no collar), thereby assisting a user in rotating the support rod 466. The support rod 466 and hinge 464 could be of a unitary construction and other adjustment mechanisms could be used to limit angle G.

Figure 19B:
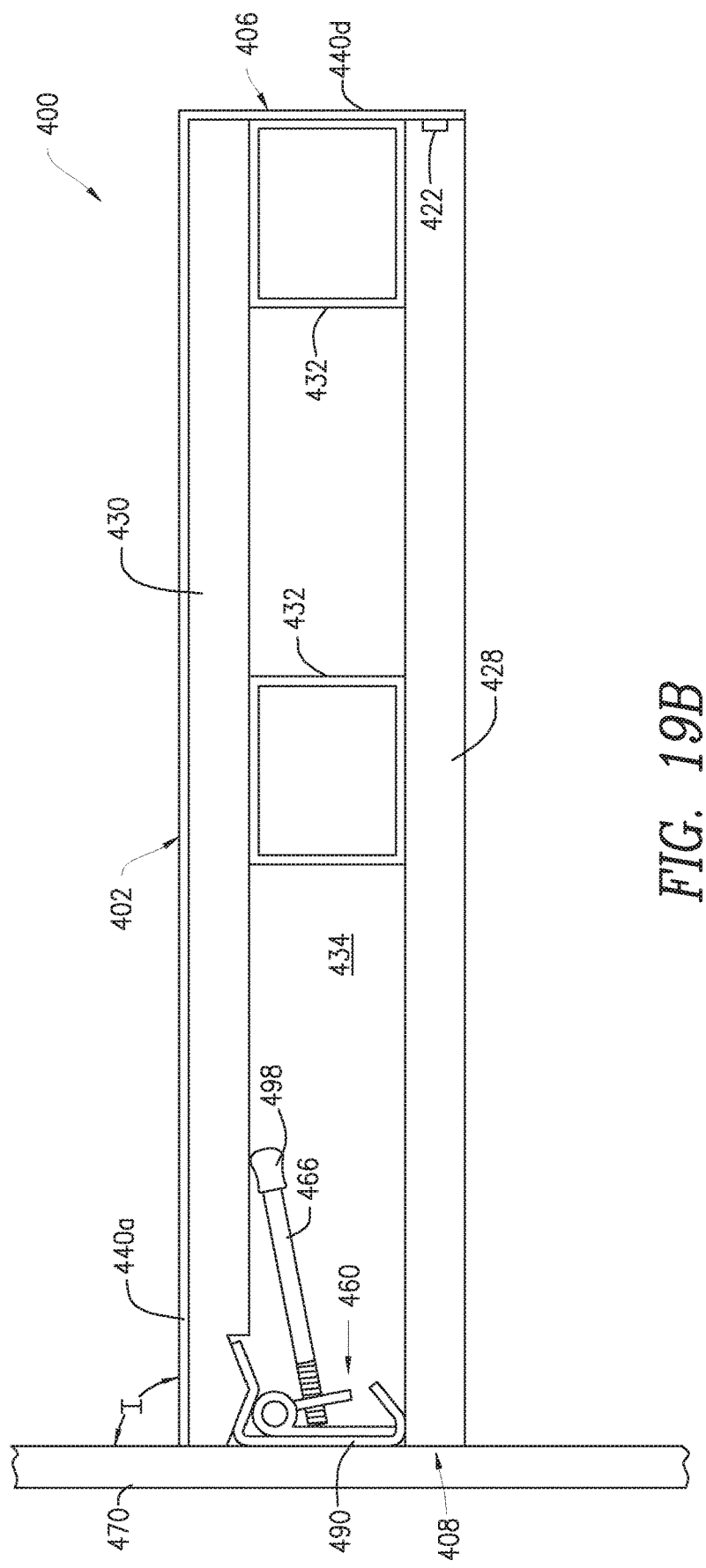

As shown in FIGS. 18A, 19A, and 19B, fixed portion 490 of hinge 464 is restrained from movement normal to (e.g., perpendicular to or away from) back plate 474 by lower bracket 476 and upper bracket 478. However, fixed portion 490 may be slidably movable parallel to, and along, back plate 474. This would provide an installer with flexibility in positioning the mounting bracket 460. For example, the electrical outlet 472 may not be centered where the installer desires to hang the floating shelf 400. Instead of having to move a preexisting outlet, the installer can mount the wall harness 462, centered on the desired location, aligning any of the appropriate apertures 468 to with the electrical outlet 472. Once the wall harness 462 is mounted on the wall, the hinges 464 can be positioned to an appropriate location along the length of the wall harness 462 where they do not obstruct the electrical outlet 472.

FIGS. 19A and 19B show another aspect of the present disclosure. More specifically, FIG. 19A is a cross-sectional view of the mounting bracket 460 and floating shelf 400 in a first position and FIG. 19B is a cross-sectional view of the mounting bracket 460 and floating shelf 400 in a second position.

The floating shelf, indicated generally at 400, includes the same features and/or materials as the floating shelf 300 described in connection with FIGS. 9-15, except where otherwise noted. The floating shelf 400 could include a bottom layer 428 of clear Plexiglas (e.g., acrylic) having a groove 422 (e.g., or chamfer) along a front side 406 thereof. Groove 422 could receive an LED lighting strip (not shown). According to some aspects of the present disclosure, the LED light strip could be affixed within the groove 422 using a double-sided bonding tape, such as for example, VHB™ adhesive acrylic tape manufactured by the 3M™ Company, or any other suitable double-sided bonding tape or adhesive. A top layer 430 of plywood (e.g., ½ inch) could be positioned over the bottom layer 428, with one or more spacers 432 therebetween. The spacers 432 could be aluminum tubing, such as square aluminum tubing (e.g., 1.5 inches). The spacers 432 could be positioned along the front, left, and right edges and center of the top and bottom layers 428,430, thereby defining a pocket 434 and rear opening 436 therebetween. A power jack could be positioned on an inner surface of one of the spacers 432, or anywhere in the pocket 434, and electrical wiring could be fed through the spacer 432 to the LED strip. A laminate 440a,d could be positioned on the top side 402, front side 406, left side (not shown), right side (not shown), and rear side (not shown) of the shelf 400. As shown in FIG. 19B, floating shelf 400 could include a mounting groove 448 which extends laterally between the left and right sides of the floating shelf 400. Importantly, the profile of the mounting groove 448 is sized and shaped to receive and mate with the upper bracket 478 of the mounting bracket 460.

The floating shelf 400 includes pocket 434 having opening 436 in the back side 408 of the floating shelf 400. As shown in FIGS. 19A and 19B, the pocket 434 receives mounting bracket 460, discussed herein. In order mount the floating shelf 400 onto the mounting bracket 460, the floating shelf 400 is first positioned according to the configuration shown in FIG. 19A (e.g., the shelf 400 being obliquely positioned relative to the wall 470, the upper bracket 478 of the mounting bracket 460 being at least partially positioned in the pocket 434 through the opening 436 of the shelf 400, and the front side 406 of top layer 430 being positioned at the intersection of the wall 470 and the mounting bracket 460). Once the shelf 400 is so positioned, the shelf 400 is rotated in the direction as indicated by arrow H until the shelf 400 is fully engaged in its second, and final, position (e.g., normal to, or about normal to, wall 470) as shown in FIG. 19B.

The angle of the shelf, as indicated by arrow I, is at least partially determined according to the position of support rods 466. As previously discussed herein, the angle G (see FIG. 18D) between the fixed portion 490 and the rotatable portion 492 of the hinge 464 can be varied by rotating the support rods 466. As shown in FIG. 19B, when the shelf 400 is fully engaged with the mounting bracket 460, the bumper 498 of the support rod 466 is frictionally engaged with an underside of the top layer 430 and provides support for the shelf 400. By rotating the support rods 466, the angle of the support rods 466 (e.g., relative to the wall 470) is altered, the point at which the bumper engages the underside of the top layer 430 is altered, and thus, angle I is altered. Accordingly, an installer or user of the shelf 400 can easily adjust the angle I of the shelf 400 by simply rotating the support rods 466 of the mounting bracket 460 and reattaching the floating shelf 400.

Figure 20:
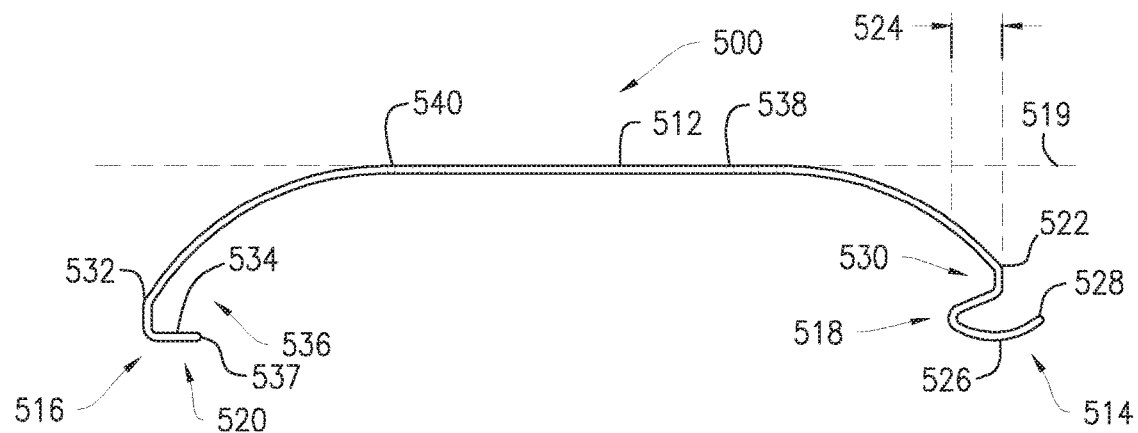
FIG. 20 is a side view of a mounting bracket for a recess mounted light.
Figure 21:
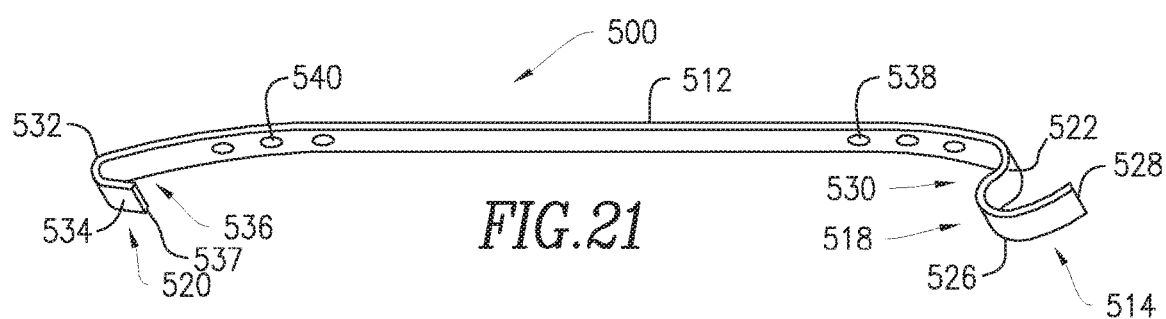
FIG. 21 is a perspective view of a mounting bracket of FIG. 20.
Figure 22:
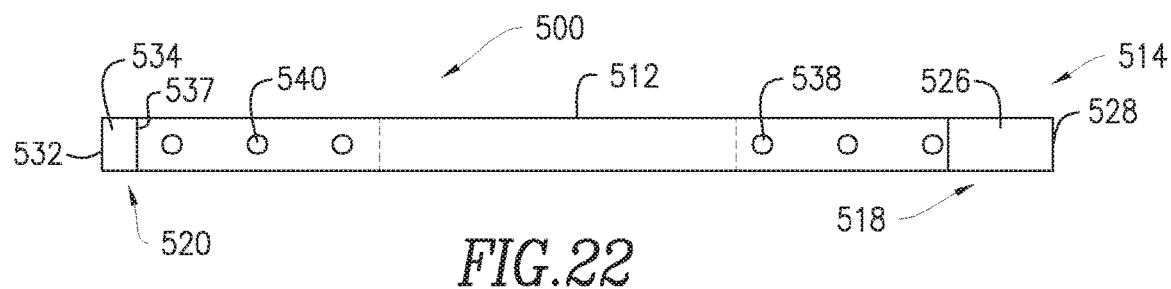
FIG. 22 is top view of a mounting bracket of FIG. 20.
Figure 23:
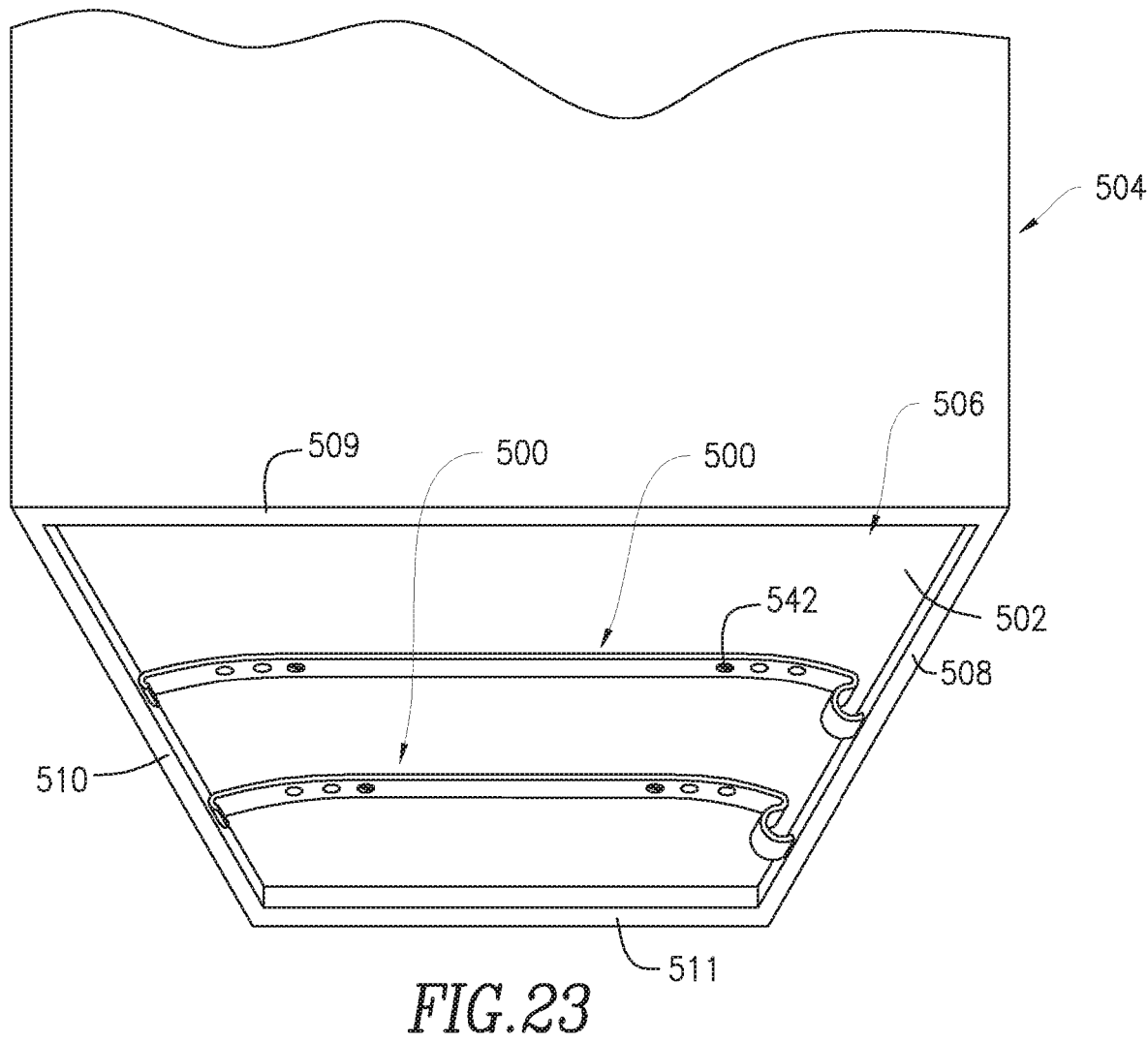
FIG. 23 is a perspective view of two of the mounting brackets shown in FIG. 20 fixed within a recess of a cabinet.
Figure 24:
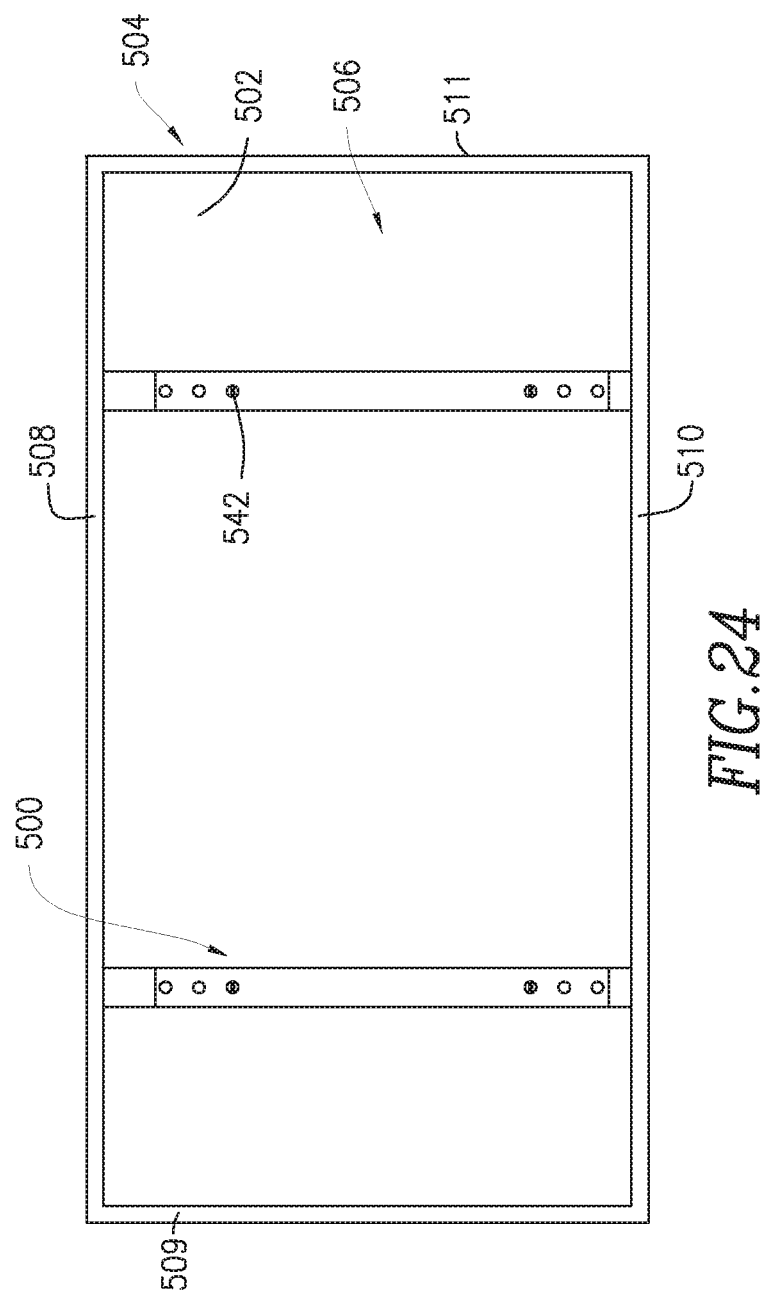
FIG. 24 is a bottom view of the mounting brackets shown in FIG. 23 fixed within a recess of a cabinet.
Figure 28:
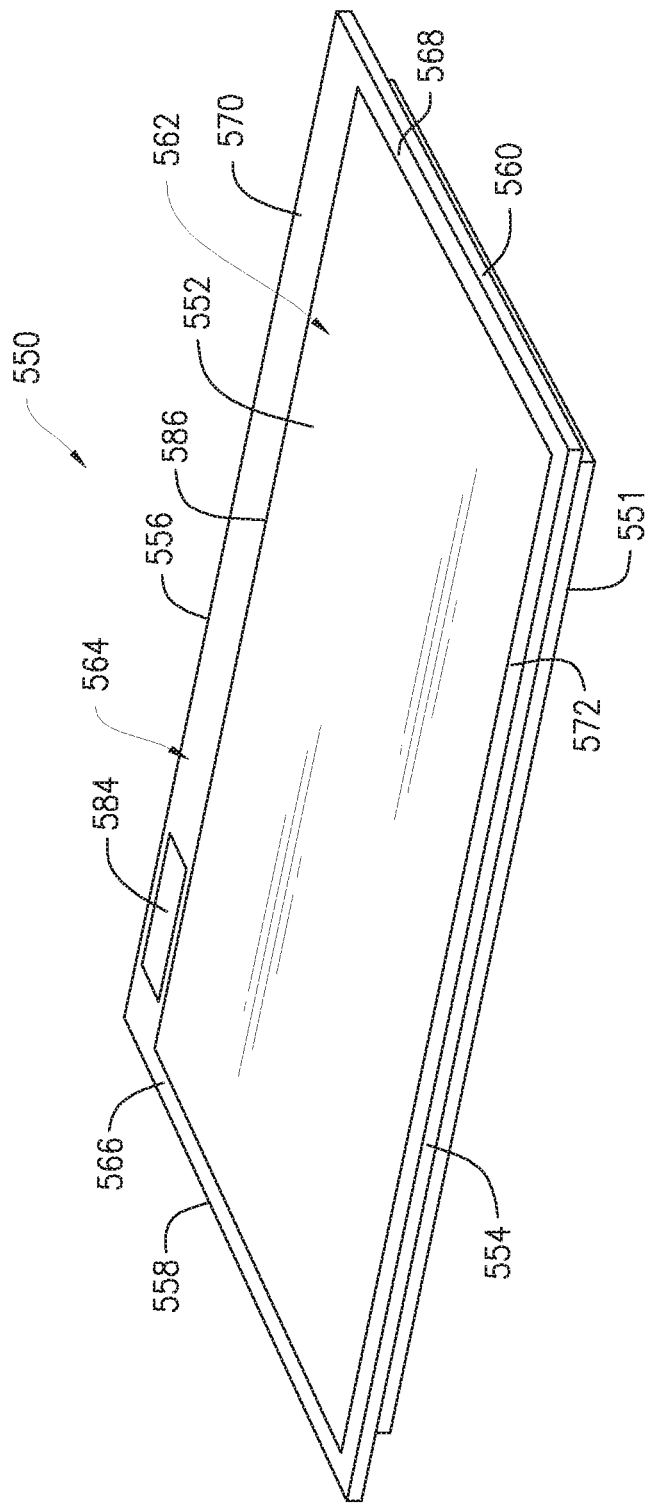
FIG. 28 is a perspective view of a mountable light.

FIG. 20 is a side view of a mounting bracket 500 for detachably coupling a light 550 of FIG. 28 to the underside of a surface, such as a bottom surface of a cabinet, FIG. 21 is a perspective view of the mounting bracket 500, FIG. 22 is a top view of the mounting bracket 500, FIG. 23 is a perspective view of mounting brackets 500 fixed to the bottom surface 502 of the cabinet 504, and FIG. 24 is a bottom view of mounting brackets 500 fixed to the bottom surface 502 of the cabinet 504. The bottom surface 502 of the cabinet 504 can define the lowermost plane of the cabinet 504. The cabinet 504 can include a recessed area 506 having the bottom surface 502 therein, with sidewalls 508, 509, 510, 511 extending lower beyond the plane defined by the bottom surface 502. The mounting bracket 500 allows for coupling of the recess mounted light 550 to the bottom surface 502 of cabinet 504 with or without a recessed area 506.

Still with reference to FIGS. 20-24, the mounting bracket 500 includes an elongated body 512 defining a proximal end 514 and a distal end 516. The body 512 can be fabricated from a metal, plastic, combinations thereof, or the like, such that one or more portions of the body 512 can have sufficient flexibility for a snap fit around the recess mounted light 550, and sufficient bias to maintain the recess mounted light 550 coupled to the mounting bracket 500 until removal is desired. The proximal end 514 includes a first fixation portion 518 defining a substantially S-shaped curvature extending from the body 512 (e.g., extending beyond a plane 519 defined by the central planar portion of the body 512). The distal end 516 includes a second fixation portion 520 defining a substantially U-shaped curvature extending from the body 512 (e.g., extending beyond a plane 519 defined by the central planar portion of the body 512). The area of the body 512 between the first and second fixation portions 518, 520 can be substantially planar and/or can be curved at least partially away from the plane 519 based on the depth of the recess 506 in the cabinet 504.

The first fixation portion 518 includes a first section 522 curving away from the body 512 (e.g., away from plane 519). The first section 522 initially curves outward away from the central portion of the body 512, and further curves inwardly over the central portion of the body 512 by a distance 524. The first fixation portion 518 includes a second section 526 extending from the first section 522 away from the central portion of the body 512 and defining an endpoint 528 of the first fixation portion 518. The curvature of the first fixation portion 518 allows the first fixation portion 518 to be flexed away from the central portion of the body 512 to permit insertion of the a portion of the recess mounted light 550 within a groove 530 formed between the first fixation portion 518 and the body 512, and insertion of the inwardly directed curved area of the first fixation portion 518 within a channel in the frame of the recess mounted light 550. Upon release of the first fixation portion 518, the first fixation portion 518 biases back to the position shown in FIG. 20, thereby detachably coupling the recess mounted light 550 to the mounting bracket 500.

The second fixation portion 520 includes a first section 532 curving and extending substantially away from the body 512 (e.g., plane 519), and a second section 534 extending substantially perpendicularly relative to the first section 532 and substantially parallel to the body 512, thereby defining a substantially U-shaped configuration. The second section 534 extends partially over the body 512 to form a hook-like configuration with an inner groove 536 opposing the groove 530 on the opposing end of the mounting bracket 500. During installation, one end or edge of the recess mounted light 550 can be inserted into the groove 536 and an endpoint 537 of the second fixation portion 520 can fit within a channel in the frame of the recess mounted light 550. The opposing end or edge of the recess mounted light 550 can be positioned adjacent to the first fixation portion 518. The first fixation portion 518 can be flexed back away from the second fixation portion 520 to permit insertion of the end or edge of the recess mounted light 550 into the groove 530, and released to maintain the recess mounted light 550 between the first and second fixation portions 518, 520.

The mounting bracket 500 includes two or more holes 538 extending through the planar portion of the body 512 and offset from the first fixation portion 518. The mounting bracket 500 includes two or more holes 540 extending through the planar portion of the body 512 and offset from the second fixation portion 520. The holes 538, 540 can be used to fix the mounting bracket 500 to the bottom surface 502 of the cabinet 504 with fasteners 542. The spaced positioning of the holes 538, 540 allows the mounting bracket 500 to be adjusted based on the size of the recessed area 506 and/or the spacing between the sidewalls 508, 510.

Figure 26:
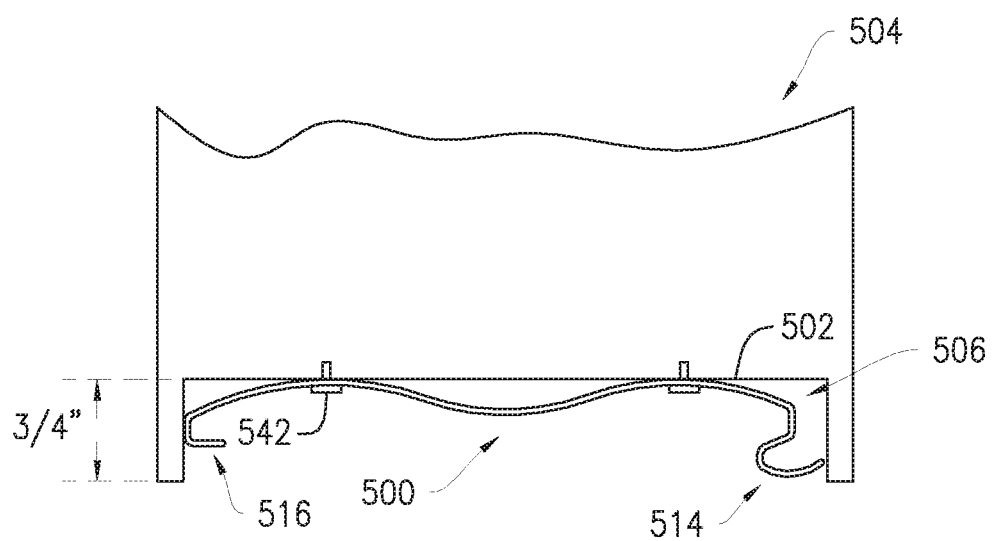
FIG. 26 is a side view of a mounting bracket of FIG. 20 fixed within a ¾ inch recess of a cabinet.

The central portion of the mounting bracket 500 can be flexed outwardly from the bottom surface 502 of the cabinet 504 prior to fixation of the mounting bracket 500 to position the first and second fixation portions 518, 520 within the sidewalls 508, 510 (see, e.g., FIG. 26). Holes 538, 540 closer to the center of the mounting bracket 500 can be used to fix the mounting bracket 500 to the cabinet 504, allowing for the ends of the mounting bracket 500 to be bent in a curved manner as needed to correspond with the extension of the sidewalls 508, 510 (e.g., depending on the depth of the recess 506 in the cabinet 504). For example, if the recessed area 506 is deep, the innermost holes 538, 540 can be used to secure the mounting bracket 500 to the bottom surface 502 of the cabinet 504, and the ends of the mounting bracket 500 can be bent away (e.g., in a curved configuration) from the bottom surface 502 to position the ends of the mounting bracket 500 at or close to the lowermost area of the cabinet 504. The mounting bracket 500 can be provided with ends that are bent or curved away from the holes 538, 540, with further customization or bending of the mounting bracket 500 ends performed after fixation of the mounting bracket 500 to the cabinet 504. Customized positioning of the ends of the mounting bracket 500 relative to the lowermost area of the cabinet 504 allows for the light panel 550 to be coupled to the mounting bracket 500 at a position substantially flush with the lowermost area of the cabinet 504 (e.g., the bottom surface of the sidewalls 508, 510).

Figure 25:
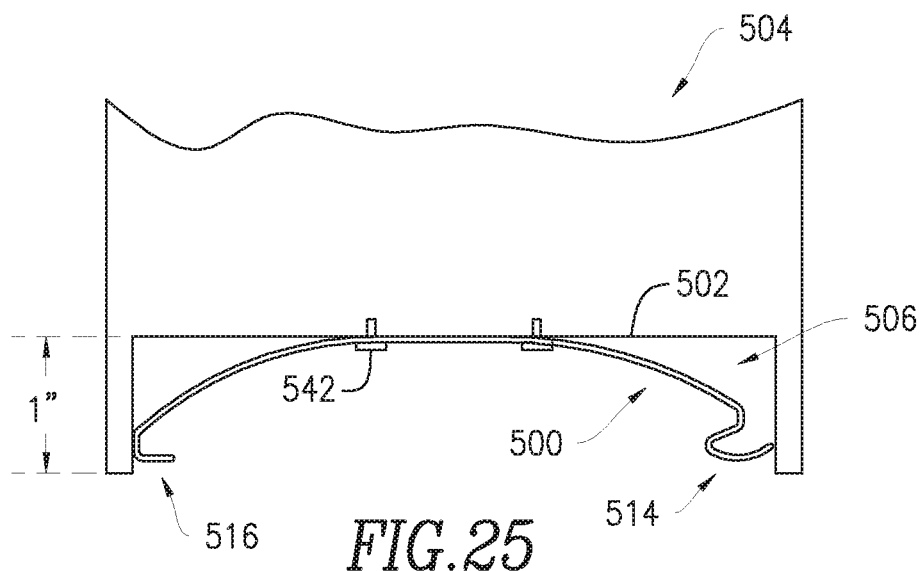
FIG. 25 is a side view of a mounting bracket of FIG. 20 fixed within a 1 inch recess of a cabinet.
Figure 27:
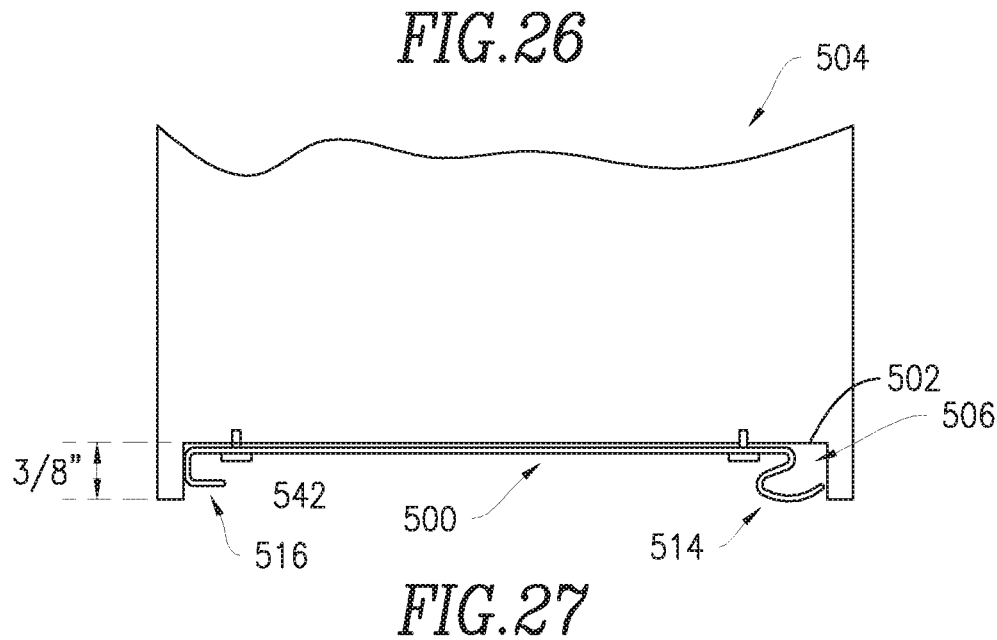
FIG. 27 is a side view of a mounting bracket of FIG. 20 fixed within a ⅜ inch recess of a cabinet.

As an example, FIG. 25 shows the mounting bracket 500 fixed within a recess 506 having a depth of about 1 inch. The innermost holes 538, 540 can be used to secure the mounting bracket 500 to the bottom surface 502 of the cabinet 504, with the proximal and distal ends 514, 516 curved away from the bottom surface 502 to a position near the lowermost area of the cabinet 504. The body 512 between the fasteners 542 can be substantially flat or planar, positioned immediately adjacent to the bottom surface 502. As a further example, FIG. 26 shows the mounting bracket 500 fixed within a recess 506 having a depth of about ¾ inches. The middle holes 538, 540 can be used to secure the mounting bracket 500 to the bottom surface 502 of the cabinet 504, with the proximal and distal ends 514, 516 partially curved away from the bottom surface 502 to a position near the lowermost area of the cabinet 504. The body 512 between the fasteners 542 can be curved away from the bottom surface 502 to reduce the overall length needed of the mounting bracket 500. As a further example, FIG. 27 shows the mounting bracket 500 fixed within a recess 506 having a depth of about ⅜ inches. The outermost holes 538, 540 can be used to secure the mounting bracket 500 to the bottom surface 502 of the cabinet 504, with the proximal and distal ends 514, 516 remaining in a substantially unbent configuration relative to the body 512. The body 512 between the fasteners 542 can be substantially flat or planar, positioned immediately adjacent to the bottom surface 502.

Figure 29:
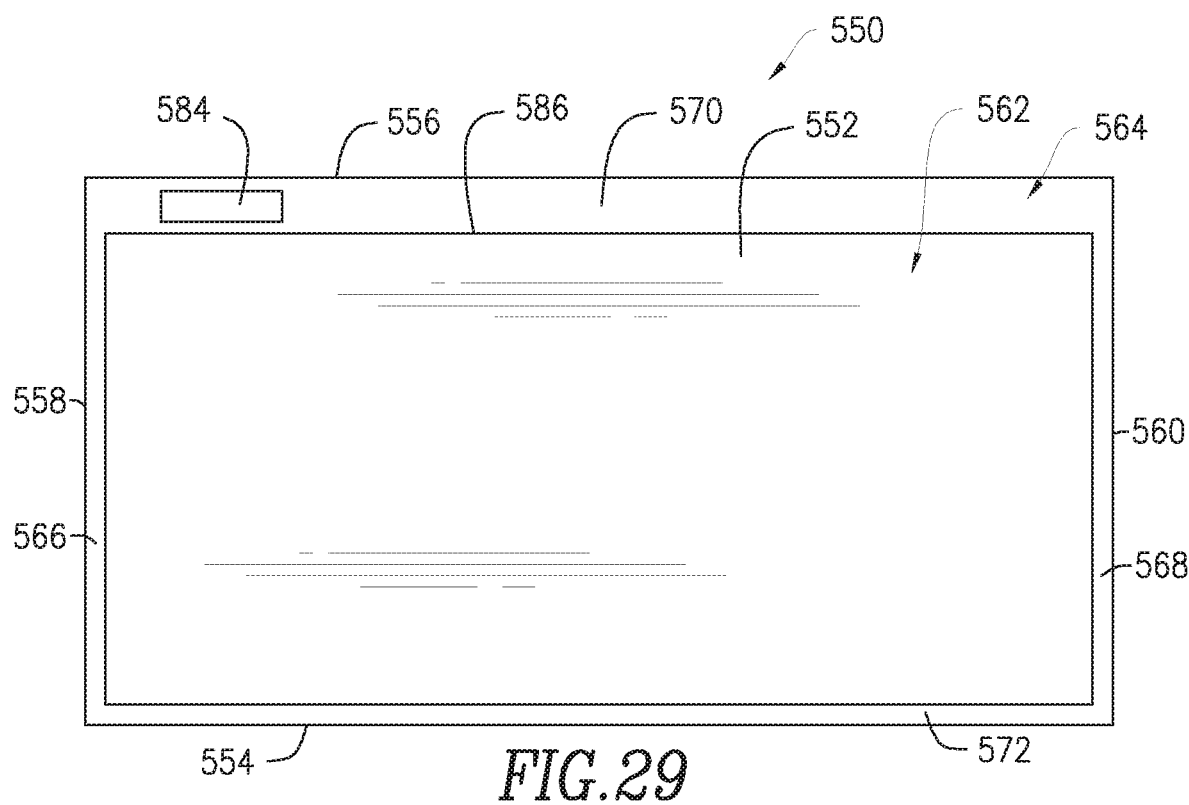
FIG. 29 is a bottom view of the light of FIG. 28.
Figure 30:
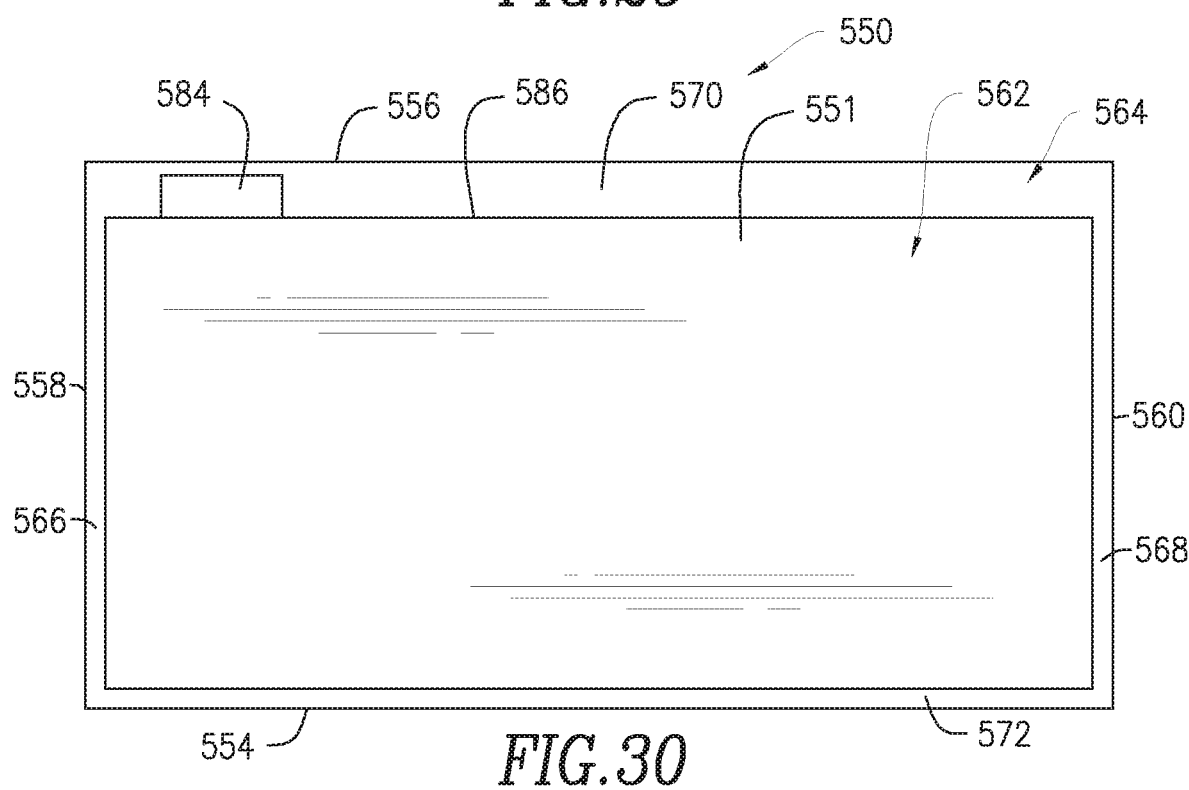
FIG. 30 is a top view of the light of FIG. 28.
Figure 31:
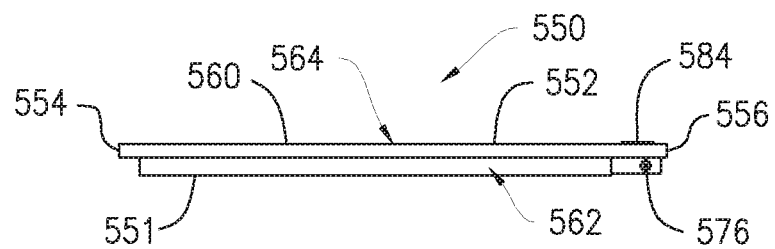
FIG. 31 is a left side view of the light of FIG. 28.
Figure 32:
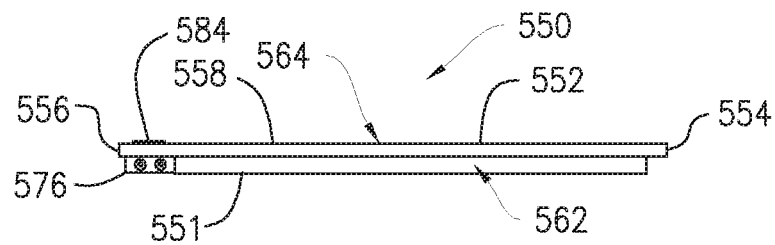
FIG. 32 is a right side view of the light of FIG. 28.
Figure 33:
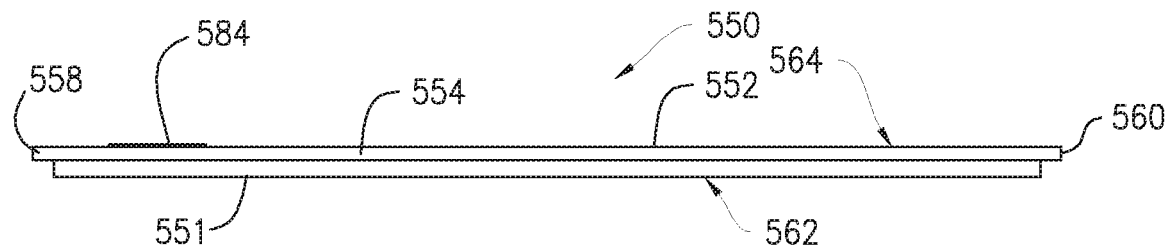
FIG. 33 is a front view of the light of FIG. 28.
Figure 34:
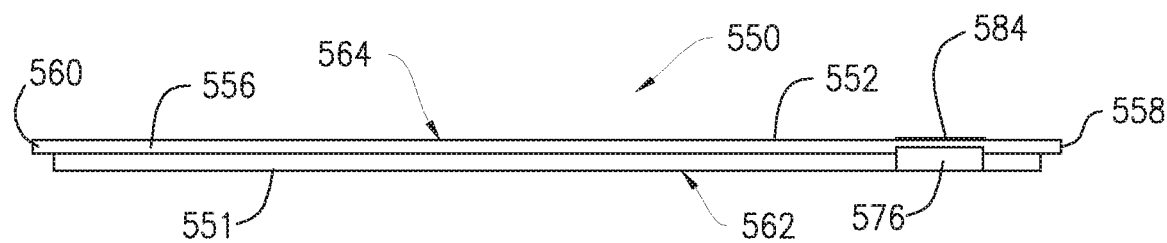
FIG. 34 is a rear view of the light of FIG. 28.
Figure 35:
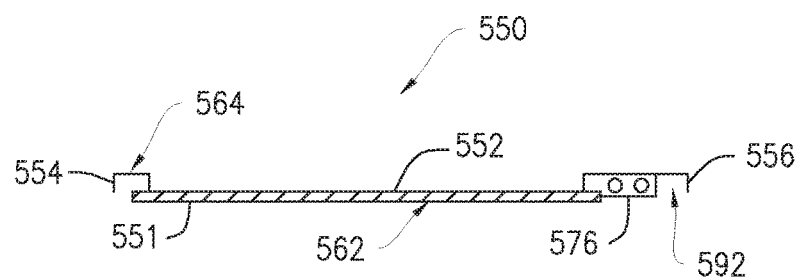
FIG. 35 is a right side, cross-sectional view of the light of FIG. 28.
Figure 36:
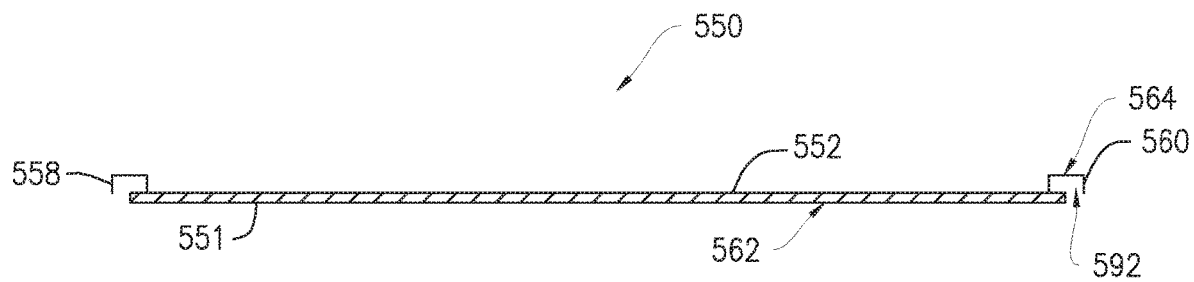
FIG. 36 is a front, cross-sectional view of the light of FIG. 28.
Figure 37:
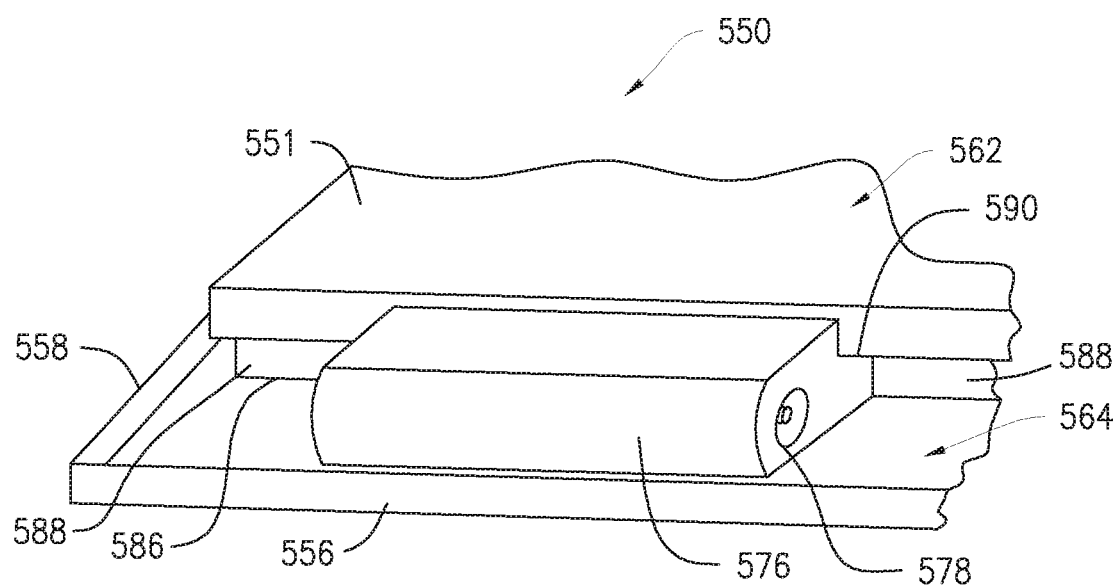
FIG. 37 is a detailed view of an electrical connector of the light of FIG. 28.
Figure 38:
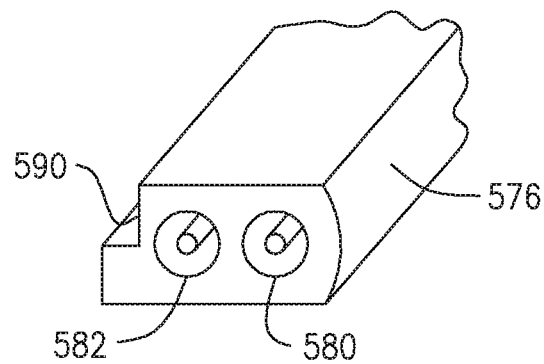
FIG. 38 is a detailed view of a side of an electrical connector of the light of FIG. 28.
Figure 39:
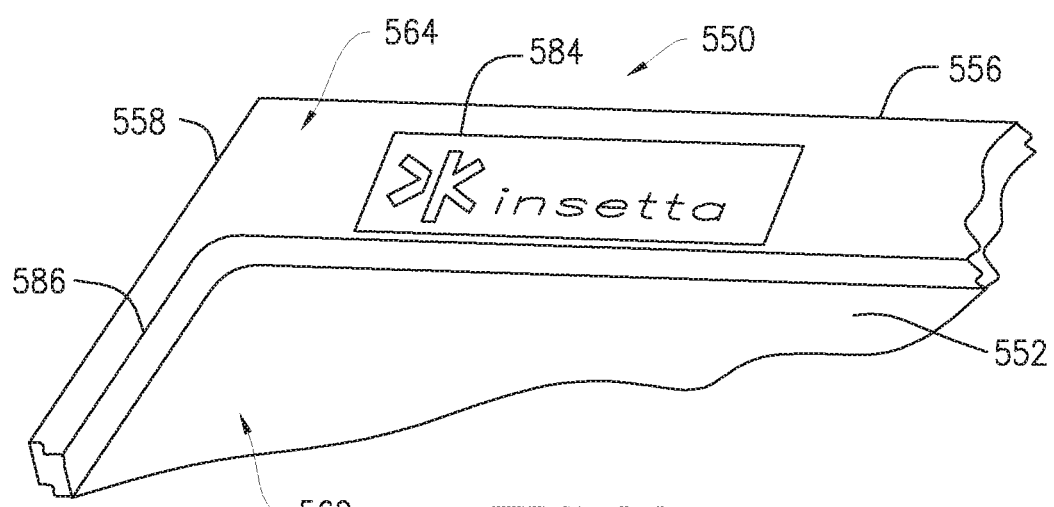
FIG. 39 is a partial top view of the light of FIG. 28.

FIG. 28 is a bottom perspective view of a light panel 550, FIG. 29 is a bottom view of the light 550, FIG. 30 is a top view of the light 550, FIG. 31 is a left view of the light 550, FIG. 32 is a right view of the light 550, FIG. 33 is a front view of the light 550, FIG. 34 is a rear view of the light 550, FIG. 35 is a right, cross-sectional view of the light 550, FIG. 36 is a front, cross-sectional view of the light 550, and FIGS. 37-39 are detailed views of the light 550. The recess mounted light 550 includes the same features and/or materials as the lights discussed herein, except where otherwise noted.

The recess mounted light 550 has a top side 551, a bottom side 552, a front side 554, a rear side 556, a left side 558, and a right side 560. The recess mounted light 550 includes a light panel 562 engaged with and surrounded by a frame 564. The frame 564 can assist in mounting the recess mounted light 550 within a recess 506 at the bottom surface 502 of a cabinet 504 using mounting brackets 500. The light panel 562 can be substantially similar in structure and/or function to the lights described herein except as noted otherwise. The bottom side of the light panel 562 can be substantially transparent or altered to scatter light evenly downward, while the top side of the light panel 562 can be laminated with white laminate to reflect the light downward. The front side, rear side, left side, and right side of the light panel 562 can also be laminated to assist in reflecting light downward. The light can be reflected downward and toward a wall (e.g., in a direction away from the user and away from the front side of the light panel 562).

The width of the right and left sides 566, 568 of the frame 564 can be dimensioned substantially equal to each other. The width of the rear side 570 of the frame 564 can be dimensioned greater than the width of the front side 572 of the frame 564 to accommodate a junction box 576 (e.g., a switch). The top side of the frame 564 includes a channel 592 formed within the frame 564 (see, e.g., FIGS. 35 and 36). The channel 592 can be dimensioned greater in width at the rear side 556 of the recess mounted light 550 as compared to the front side 554, right side 558, or left side 560. As will be described in greater detail below, the channel 592 can be configured to receive at least a portion of the mounting bracket 500 for detachably fixing the recess mounted light 550 to the mounting bracket 500. The junction box 576 can include one or more connectors 578 for power in (see, e.g., FIG. 37), and one or more connectors 580, 582 for power out (see, e.g., FIG. 38). For example, the power in connector 578 can connect the recess mounted light 550 to a power source. The power out connectors 580, 582 can be used to interconnect multiple recess mounted lights 550 such that a single power source can be used for multiple recess mounted lights 550 positioned adjacent to each other. Such installation minimizes the number of wires needed to power each recess mounted light 550.

Although shown as a single junction box 576 with power or electrical connectors 578-582, one or more junction boxes 576 can be included with the recess mounted light 550. For example, a single junction box 576 can include one power input and two power output terminals. As a further example, one junction box 576 can include one power input terminal, and another junction box 576 can include two power output terminals. The power input and output terminals can thereby be provided separately or together within a single junction box 576. At the bottom side 552, the junction box 576 can electrically connect to a user interface 584 for operating the recess mounted light 550. Electrical wiring can extend between and connects the electrical connectors 578-582 to the LED lights through the grooves 588, or along the edge(s) of the light panel 562.

The user interface 584 can be in the form of an ON/OFF switch, a touch sensitive panel for turning the light on and off, and/or a touch sensitive panel that allows for setting different levels of brightness based on the duration of pressure maintained on the user interface 584. For example, a single touch of the recess mounted light 550 at the user interface 584 (e.g., or any area of the bottom surface 552) can actuate the light 550 into an ON position, and a single touch of the light 550 at the user interface 584 (e.g., or any area of the bottom surface 552) of the light 550 can actuate the light 550 into an OFF position. Touching and holding the light 550 at the user interface 584 (e.g., or any area of the bottom surface 552) can gradually or incrementally increase and/or decrease brightness level of the emitted light from the light 550.

The edges of the light panel 562 are offset from the right, left, rear and front sides 554-560 of the frame 564. The frame 564 includes a substantially rectangular opening 586 configured to receive therein in a fixed manner the light panel 562. The light panel 562 includes a groove 588 formed in at least the rear side of the light panel 562 (see, e.g., FIG. 37). The right, left and/or front sides of the light panel 562 can also include similar grooves, thereby forming a substantially continuous groove 588 extending along the perimeter of the light panel 562. The groove 588 forms a stepped configuration along the perimeter of the light panel 562. The groove 588 can define a substantially semi-circular configuration.

Each of the grooves 588 can extend the entire length (or substantially the entire length) of the front side, left side, right side, and rear side, defining a substantially continuous groove extending around at least three sides or edges of the light panel 562. Each groove 588 extends only a partial distance into the interior of the light panel 562 without extending through the entire depth of the light panel 562. The partial distance or depth of the groove 588 can be, e.g., about 0.125 inches, about 0.1875 inches, about 0.25 inches, about 0.5 inches, about 0.75 inches, about 1 inch, or the like. The body of the light panel 562 can be fabricated from a single piece of material with the grooves 5887 formed in the sides or edges of the single piece of material (e.g., in the sides or edges of the light panel). An LED lighting strip (not shown) can be disposed along the front side within the groove 588. LED lighting strips (not shown) can be disposed within each of the grooves 588 along the perimeter of the light panel 562. The junction box 576 can include a stepped cutout 590 along one side configured to be received and mated with the groove 588 at the rear of the light panel 562.

Figure 43:
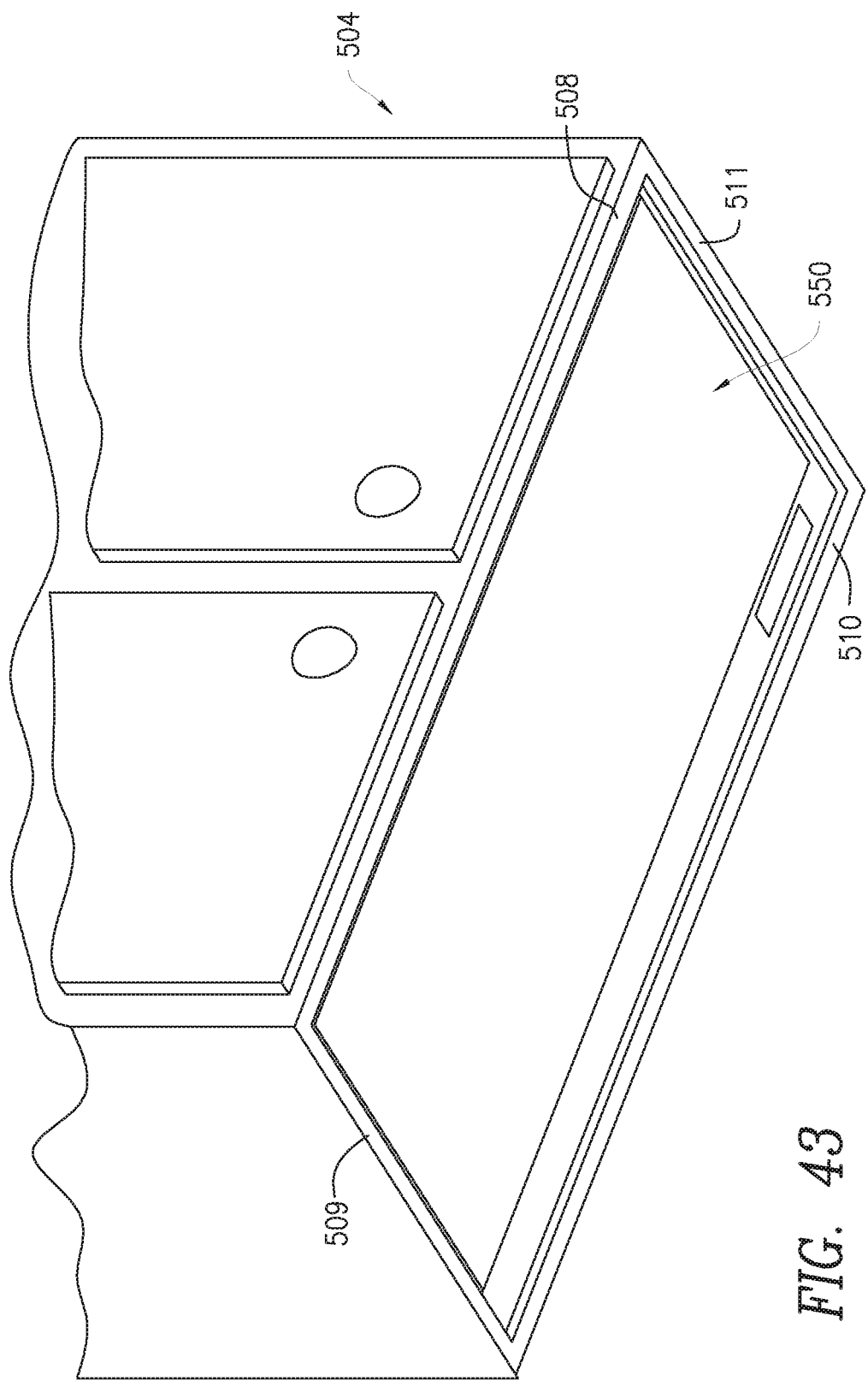
FIG. 43 is a perspective view of the light of FIG. 28 installed within a recess of a cabinet

FIG. 40 is a side view of installation of a recess mounted light 550 relative to a mounting bracket 500 fixed to a bottom surface 502 within a recess 506 of a cabinet 504, FIG. 41 is a side view of the recess mounted light 550 installed relative to the mounting bracket 500, and FIG. 42 is a side view of removal of the recess mounted light 550 from the mounting bracket 500. The recess mounted light 550 can be secured between edges of the mounting bracket 500. During installation, the front edge of the light panel 562 can be inserted into the inner groove 536 of the mounting bracket 500 and the endpoint 537 can be inserted into the channel 592 at the front edge of the frame 564. With such engagement, the distal end 516 of the mounting bracket 500 is not visible underneath the frame 564. The proximal end 514 of the mounting bracket 500 can be flexed away from the distal end 516, and the rear end of the light panel 562 can be inserted into the inner groove 530 with the endpoint 528 inserted into and engaged with the channel 592 of the frame 564. The light panel 562 is thereby engaged at the front and rear edges, and the mounting bracket 500 is completely hidden from view by the frame 564 and light panel 562. The adjustability of the mounting bracket 500 allows for the recess mounted light 550 to be secured to the cabinet 504 in a position substantially aligned with the lowermost surface of the cabinet 504. The recess mounted light 550 therefore does not extend below the cabinet 504 and provides for a well-lit area below the cabinet 504 (see, e.g., perspective view of FIG. 43). In addition, the fixation portions of the mounting bracket 500 allow for the recess mounted light 550 to be detachably secured to the cabinet 504

As shown in FIG. 42, during removal of the recess mounted light 550 from the mounting bracket 500, a tool 600 can be used. The tool 600 includes a handle 602, an elongated and substantially planar extension 604 protruding from the handle 602, and an angled end 606 extending from the extension 604. The angled end 606 can define a substantially flat or planar configuration. The connection 608 between the angled end 606 and the extension 604 can be rounded. During removal of the recess mounted light 550, the angled end 606 can be used to assist in flexing back the first fixation portion 518 of the mounting bracket 500 to release one end of the recess mounted light 550. The flat configuration of the angled end 606 provides for easier direct access behind the flange or edge of the recess mounted light 550. For example, in the mounting configuration shown in FIG. 25, the tool 600 can be fit into the groove 567 of the light 550 to assist in flexing the first fixation portion 518 of the mounting bracket 500 away from the light 550, thereby releasing tension on the light 550 and allowing for removal or adjustment of the position of the light 550. Upon release at the proximal end 514, the recess mounted light 550 can be disengaged from the distal end 516 of the mounting bracket 500.

Figure 44:
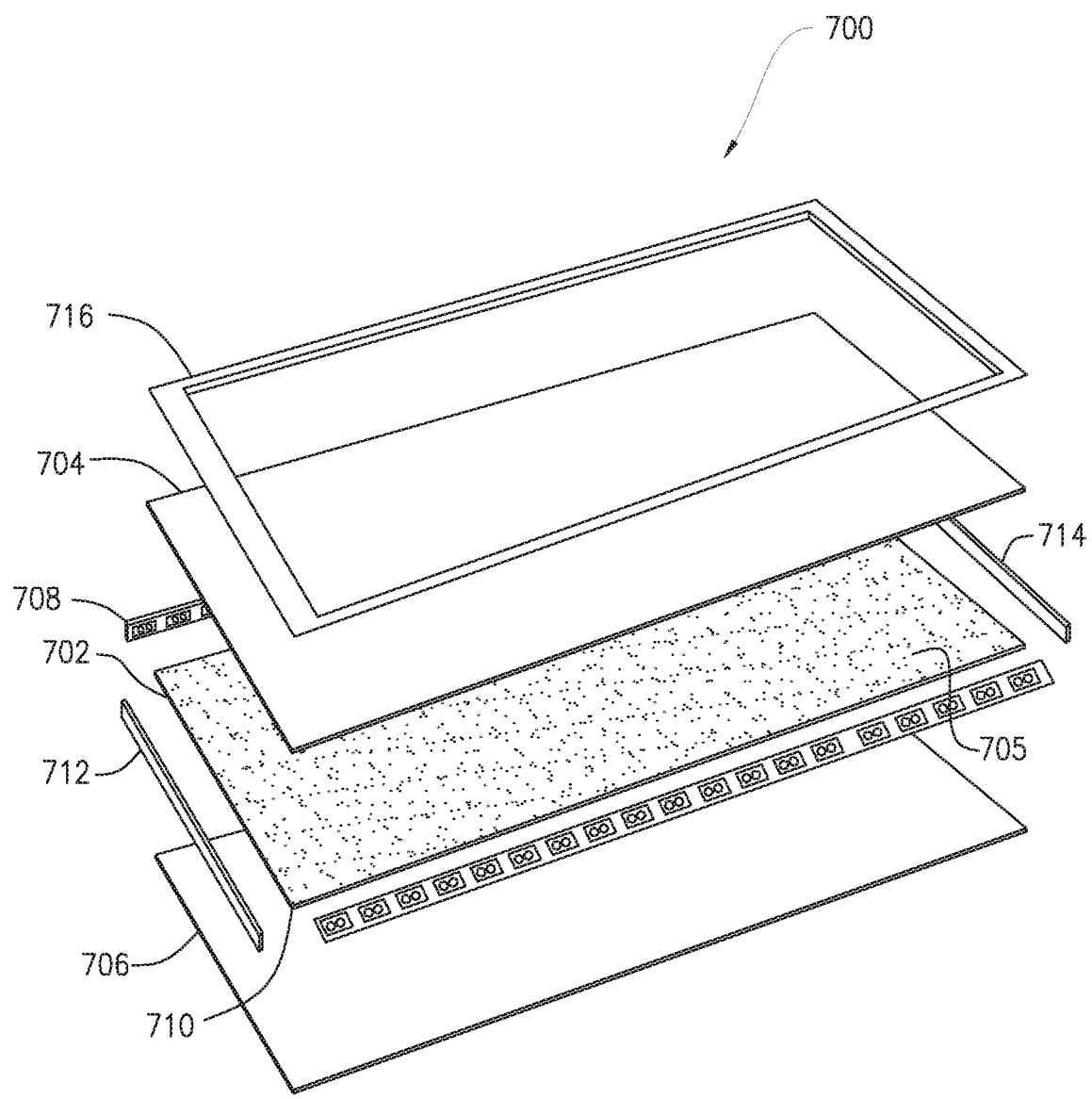
FIG. 44 is a perspective exploded view of a panel device.

FIG. 44 is a perspective exploded view of an exemplary panel device 700 (e.g., a composite plastic component, a light panel device, a recess mounted light, or the like). The panel device 700 generally includes a light bearing panel or sheet 702 (e.g., a first section), a light diffusing panel or sheet 704 (e.g., a third section), and a housing 706 (e.g., a second section). Using the exemplary manufacturing process discussed herein, the housing 706 maintains the assembly of the light bearing sheet 702 and the light diffusing sheet 704 together without the use of adhesives and/or fasteners. In some embodiments, the light bearing sheet 702 can include a polarizing film 705 secured to one or more sides of the light bearing sheet 702. The light diffusing sheet 704 can be fabricated from, e.g., a high-transparency acrylic. Both the light bearing sheet 702 and the light diffusing sheet 704 can be substantially planar and sheet-like in configuration. Although shown as rectangular in shape, it should be understood that the light bearing sheet 702 and the light diffusing sheet 704 can be of any shape, e.g., rectangular, square, circular, oval, triangular, or the like.

The panel device 700 includes a strip of LEDs 708 (e.g., a light source strip, a lighting strip, or the like) secured to one or more outer perimeter edges of the light bearing sheet 702. The light bearing sheet 702 can include substantially flat outer perimeter edges. In some embodiments, the light bearing sheet 702 can include a substantially continuous and inwardly directed groove formed in the outer perimeter edges, and extending along at least two perimeter edges. During assembly, adhesive 710 (e.g., a strip of adhesive material, a strip of double sided tape, or the like) can be applied along the light bearing sheet 702 perimeter edges that will receive the LEDs 708. In some embodiments, the adhesive 710 can be, e.g., VHB™ adhesive acrylic tape manufactured by the 3M™ Company, VHB™ 4910 adhesive tape manufactured by the 3M™ Company, or the like. The adhesive 710 is optically clear and ensures that polishing the edge of the light bearing sheet 702 is unnecessary for light transmission without scatter (as compared to traditional methods that generally necessitate a fixture to hold a light source to a panel and necessitate polishing of the panel edge to prevent scatter of light when entering the panel). In particular, the adhesive 710 provides a seamless (or substantially seamless) media for light transmission without the need for polishing the edge of the panel. After application of the adhesive 710 to the light bearing sheet 702, the strip of LEDs 708 can be positioned against and secured to the light bearing sheet 702 using the outwardly facing adhesive 710. The strip of LEDs 708 is positioned against the light bearing sheet 702 such that the LEDs themselves face inwardly toward the perimeter edge of the light bearing sheet 702. One or more wires associated with the LEDs 708 can also be at least partially secured to the light bearing sheet 702 with the adhesive 710.

By positioning the LEDs 708 against the adhesive 710, heat generated by the LEDs 708 can be transmitted through the adhesive 710 to the light bearing sheet 702, resulting in a more efficient heat transfer from the LEDs 708. In some embodiments, heat generated by the LEDs 708 can be dissipated directly through and from a front surface of each of the LEDs 708 and into the adhesive 710 without the need for a heat dissipating element. In general, it can be assumed that heat would rather travel in the same direction as the light emitting from the LEDs 708. With the LEDs 708 facing and transmitting light toward the perimeter edge of the light bearing sheet 702, heat and light travel in the same direction to the light bearing sheet 702. Such heat transfer prevents premature ageing and fading of the LEDs 708. By using a single sheet of material for the light bearing sheet 702, light emitting from the LEDs 708 moves through the light bearing sheet 702 in an optimized manner.

The material of the light bearing sheet 702 can assist in moving light across the light bearing sheet 702 during illumination of the LEDs 708. The material of the light diffusing sheet 704 helps with even diffusion or spread of the light illuminating from the LEDs 708 and passing across the light bearing sheet 702. The panel device 700 can include edge supports 712, 714 positioned against two or more edges of the light bearing sheet 702. The panel device 700 can include a frame 716 (e.g., a lower frame, a PVC frame, or the like) positioned against a bottom surface of the light bearing sheet 702. Additional edges of the light bearing sheet 702 can include the adhesive 710 to assist in the thermoforming process discussed below.

The housing 706 can be fabricated from, e.g., a high impact polystyrene (HIP), or the like. However, it should be understood that the housing 706 can be fabricated from any type of plastic capable of being heated and capable of shrinking during cooling after heating. The material of the housing is generally softer (e.g., open cell) as compared to the material of the light bearing sheet 702 and the light diffusing sheet 704. However, the light bearing and diffusing sheets 702, 704 can be fabricated from flexible materials that allow for controlled deformation during the fabrication process. If the material of the housing 706 is heated and placed over the light bearing sheet 702 and the light diffusing sheet 704 without additional steps or precautions, as the material of the housing 706 cools, solidifies and (as a result) shrinks, deformation and/or cracking of the light bearing sheet 702 and/or the light diffusing sheet 704 can occur. Deformation and/or cracking of the housing 706 can also occur. The exemplary manufacturing process discussed herein allows for overforming of the material of the housing 706 relative to the light bearing sheet 702 and the light diffusing sheet 704, such that as the material of the housing 706 cools and shrinks, the material maintains assembly of the light bearing and diffusing sheets 702, 704 without undesired deformation and/or cracking.

Figure 45:
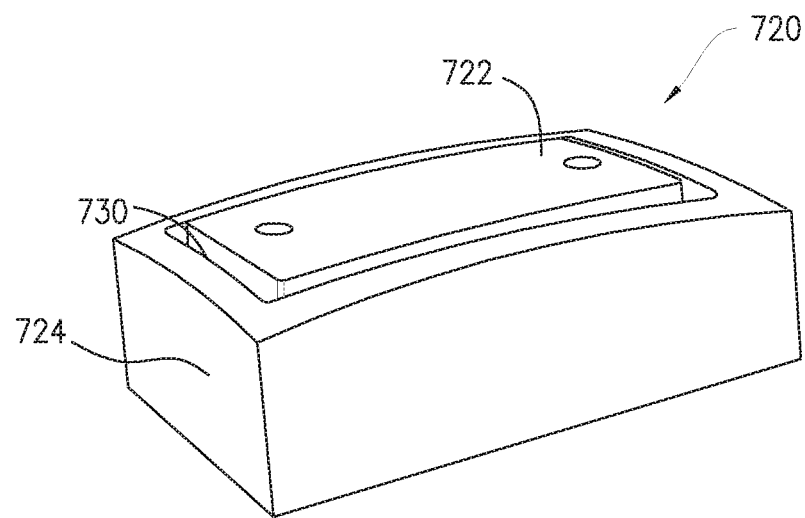
FIG. 45 is a perspective view of a mold for formation of the panel device of FIG. 44.
Figure 46:
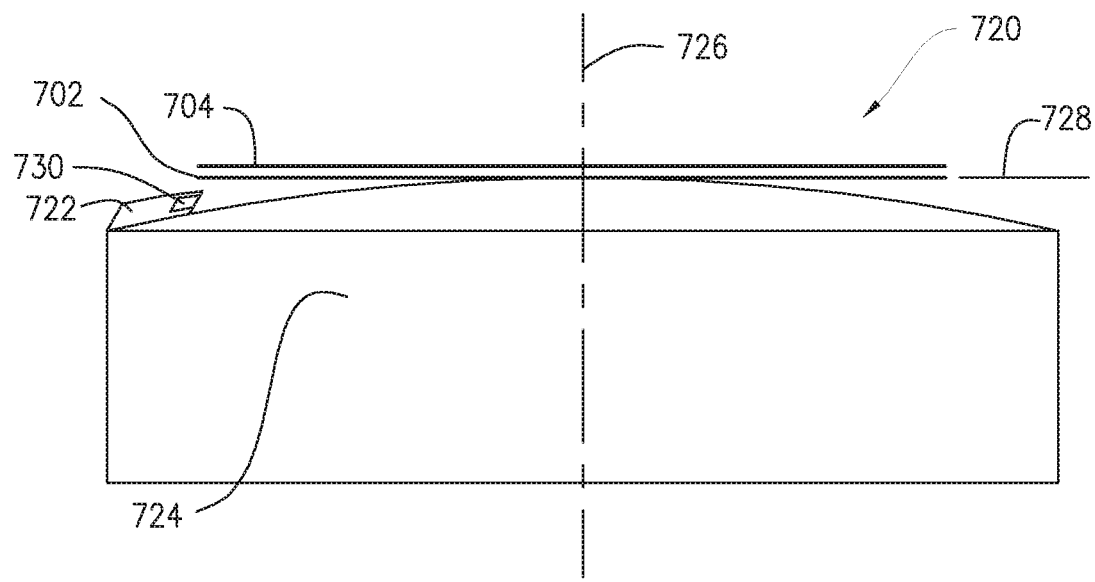
FIG. 46 is a front view of the mold of FIG. 45 including a light bearing sheet and a light diffusing sheet of the panel device of FIG. 44 prior to molding.
Figure 47:
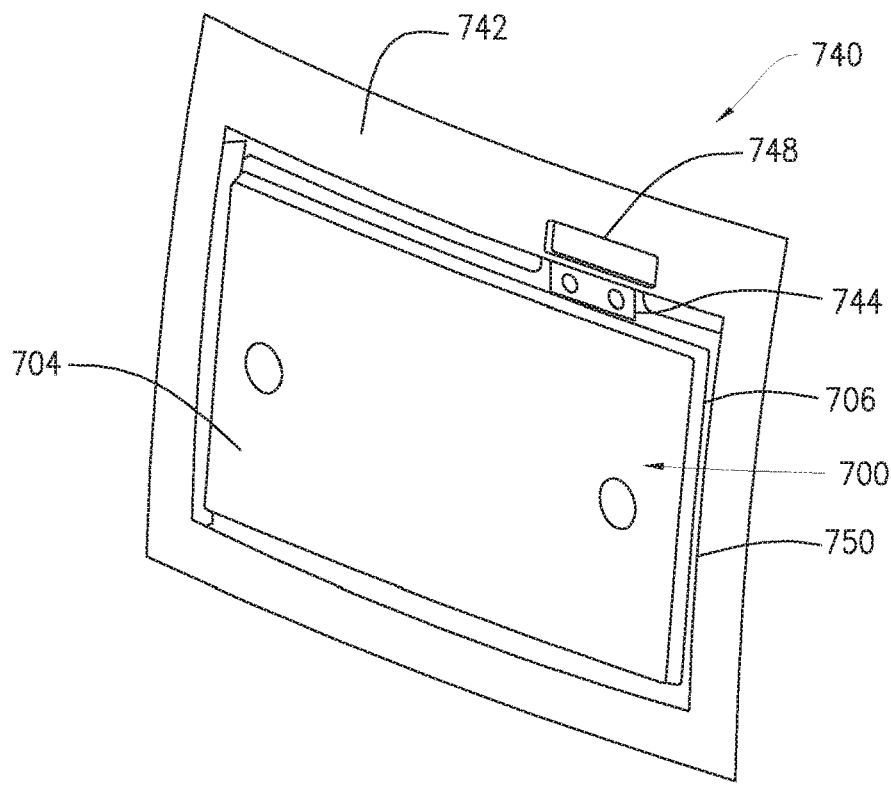
FIG. 47 is a front perspective view of a panel device prior to removal of a molding border.
Figure 48:
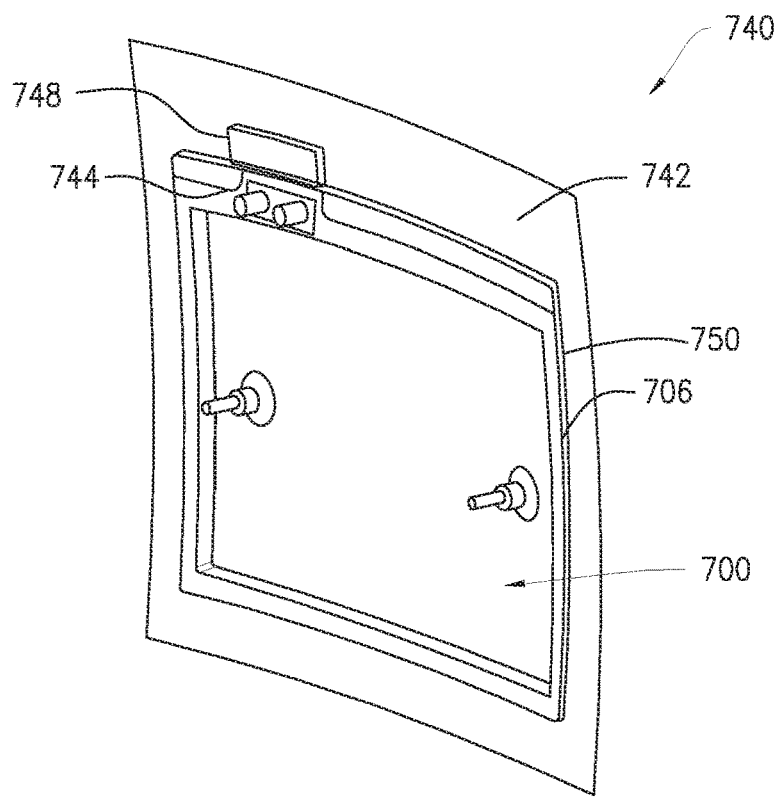
FIG. 48 is a rear perspective view of the panel device of FIG. 47.
Figure 49:
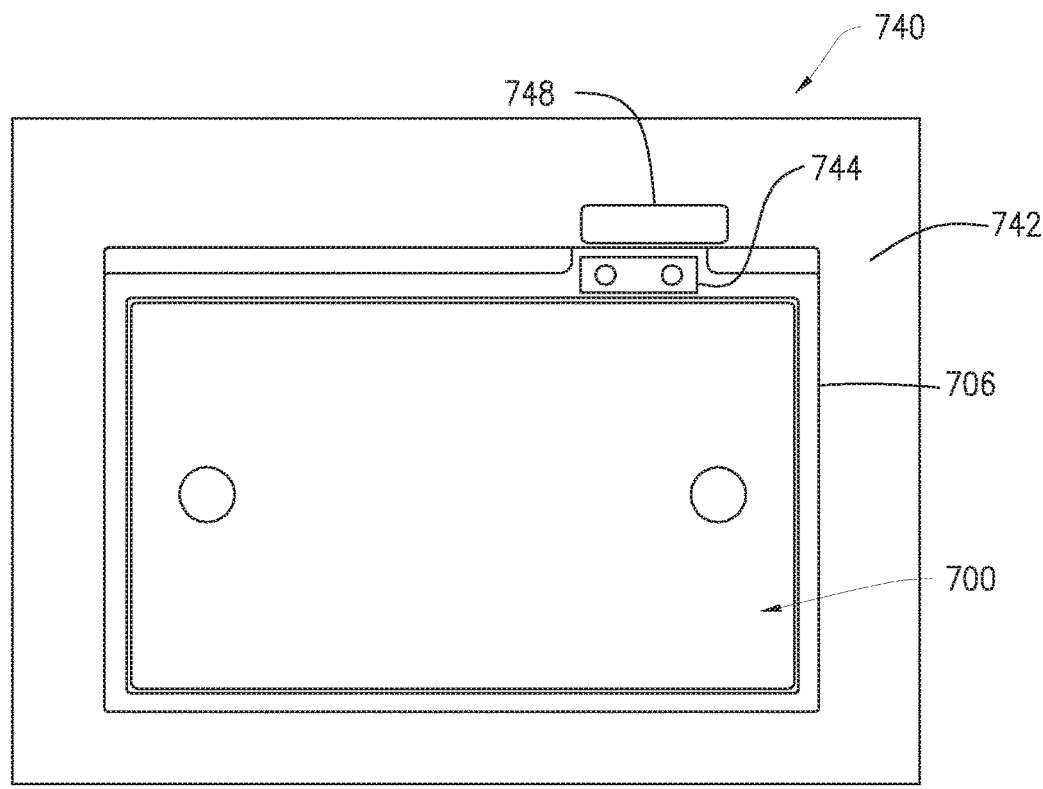
FIG. 49 is a front view of the panel device of FIG. 47.
Figure 50:
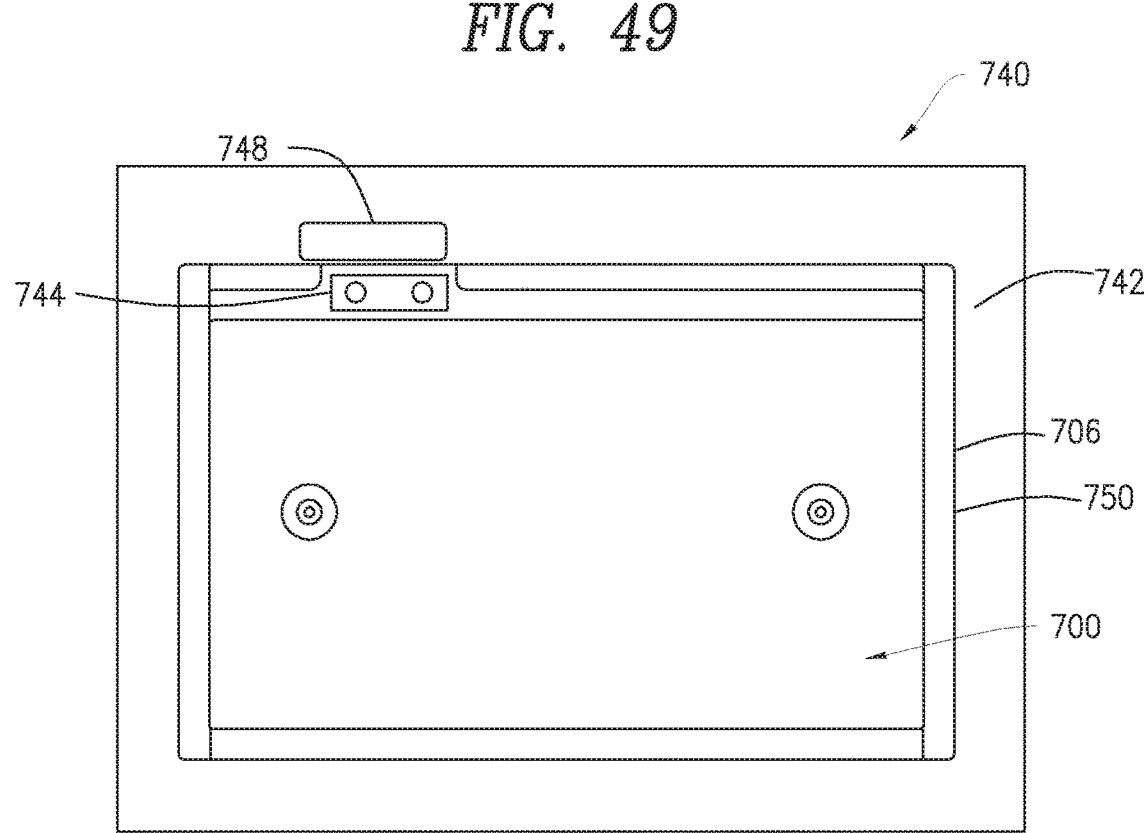
FIG. 50 is a rear view of the panel device of FIG. 47.

FIGS. 45 and 46 are perspective and side views of a mold 720 used for manufacturing and/or assembling the panel device 700. The mold 720 includes a top surface 722 and a base 724. Rather than a flat configuration, the top surface 722 curves downwardly on either side of the mold 720 from the central vertical axis 726. In some embodiments, the radius for the angle of curvature of the top surface 722 can be, e.g., about 50-80 inches, 55-80 inches, 60-80 inches, 65-80 inches, 70-80 inches, 75-80 inches, 50-75 inches, 50-70 inches, 50-65 inches, 50-60 inches, 50-55 inches, 50 inches, 55 inches, 60 inches, 65 inches, 70 inches, 75 inches, 80 inches, or the like. In some embodiments, the radius for the angle of curvature of the top surface 722 can be about 70 inches. The top surface 722 similarly curves downwardly in a direction parallel to the central vertical axis 726. The top surface 722 is therefore downwardly curved on all sides of the mold 720. The top surface 722 therefore curves downwardly relative to horizontal 728. The curved top surface 722 allows the housing 706 to be overformed (e.g., dimensioned longer and/or wider than the length and/or width of the light bearing and diffusing sheets 702, 704) to prevent undesired deformation and/or cracking of the light bearing and diffusing sheets 702, 704. The mold 720 includes a substantially rectangular cutout 730 extending downwardly into the mold 720. The cutout 730 is formed within the perimeter edges of the mold 720 and corresponds with the perimeter edges of the panel device 700.

During assembly, the frame 716 and the edge supports 712, 714 of FIG. 44 can be positioned within cutout 730 formed in the mold 720. Next, the light bearing sheet 702 and the light diffusing sheet 706 can be positioned on the top surface 722 of the mold 720 prior to assembly with the housing 706. As shown in FIG. 46, the light bearing sheet 702 and the light diffusing sheet 706 are substantially planar or flat relative to the curved top surface 722 of the mold 720. The light bearing sheet 702 of FIG. 46 includes the strip of LEDs 708 discussed above. The sheet of material corresponding with the housing 706 is placed in a heat source or oven (not shown) positioned above the mold 720. Depending on the intensity of heat source or oven, the housing 706 material can be heated between about 60 seconds and about 90 seconds until the material reaches a temperature of about 300° F. The housing 706 material can therefore initially be in the form of a stiff, planar sheet and, upon heating, becomes a soft and pliable sheet.

The heat source or oven can be retracted to expose the heated housing 706 material. In some embodiments, the housing 706 material can be lowered down onto and over the top surface 722 of the mold 720. In some embodiments, the mold 720 can be raised into the housing 706 material. In both instances, the heated housing 706 material is positioned against the top surface 722 of the mold 720, sandwiching the light bearing and light diffusing sheets 702, 704 between the housing 706 material and the mold 720. Suction or vacuum can be used to hold the housing 706 material over the mold 720. Due to the suction or vacuum, the housing 706 material, light bearing sheet 702, and light diffusing sheet 704 each temporarily conform to the curved configuration of the top surface 722 of the mold 720. The flexible nature of the light bearing and diffusing sheets 702, 704 also allows the assembly to conform to the curved shape of the top surface 722 of the mold 720.

While the housing 706 material is positioned over the mold 720, one or more fans can be actuated to blow air over the assembly for about 90 seconds to help with cooling of the heated housing 706 material. In some embodiments, water mist can be sprayed on top of the housing 706 material to assist in cooling the assembly. In some embodiments, the assembly can be cooled until the housing 706 material reaches about 110° F. Application of water mist to the assembly and/or use of fans can accelerate cooling. In some instances, cooling the assembly without application of water mist and/or fans can take too long (e.g., more than 90 seconds), which can result in distortion of the light bearing sheet 702 and/or the light diffusing sheet 704. Such distortion can result in unsatisfactory illumination from the panel device 700.

Cooling of the assembly results in a rough cut 740 of the panel device 700, as shown in FIGS. 47-52. The rough cut 740 of the panel device 700 includes the housing 706 and a molding border 742 surrounding the housing 706. After the material of the housing 706 and the molding border 742 has cooled to about 110° F., the moldering border 742 can be removed (e.g., cut away). For example, FIG. 53 shows a view of the panel device 700 after the molding border 742 has been removed from the housing 706.

The molded housing 706 includes a recessed area 744 at or near the top, front edge of the housing 706. The recessed area 744 is configured and dimensioned to receive at least partially therein a controller 746 for regulating the on/off and illumination intensity function of the panel device 700 (see, e.g., FIG. 53). The molded housing 706 includes an extension cover 748 extending from a perimeter at the top of the housing 706 and substantially aligned with the recessed area 744. After insertion of the controller 746 into the recessed area 744, the extension cover 748 can be rotated about 180° to secure or sandwich the controller 746 between the housing 706 and the extension cover 748. A power cable associated with the controller 746 can extend from the rear of the housing 706. The perimeter edges of the housing 706 can include a groove 750 configured to receive a portion of a mounting bracket such that the panel device 700 can be mounted, for example, within a recessed area of a cabinet. The groove 750 can extend substantially continuously around the entire perimeter of the housing 706. In some embodiments, the groove 750 can be formed only on two opposing sides of the housing 706.

Figure 51:
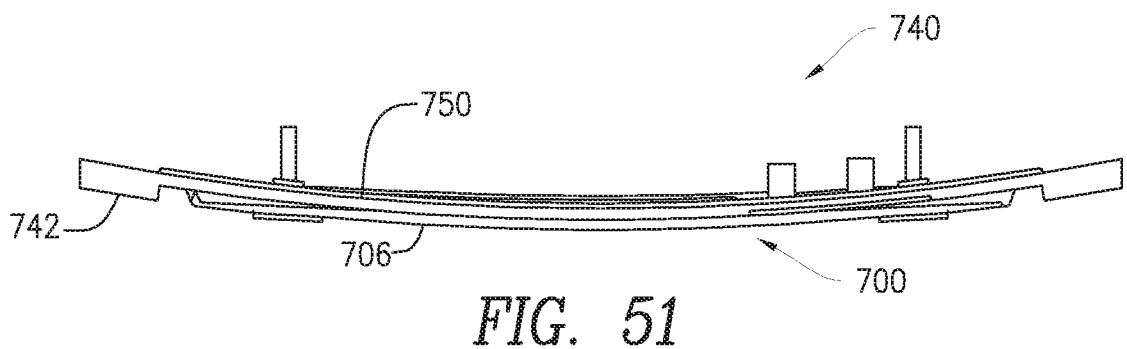
FIG. 51 is a top view of the panel device of FIG. 47.
Figure 52:
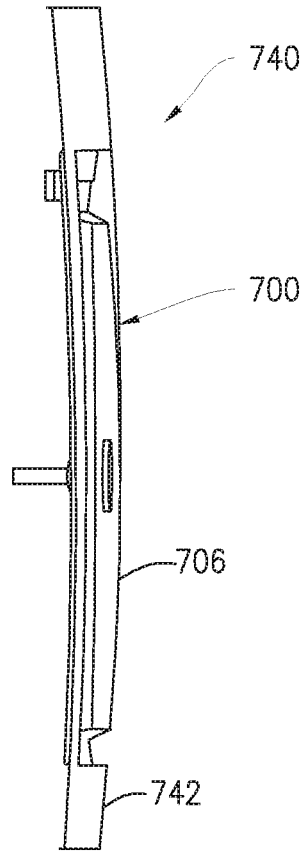
FIG. 52 is a side view of the panel device of FIG. 47.
Figure 53:
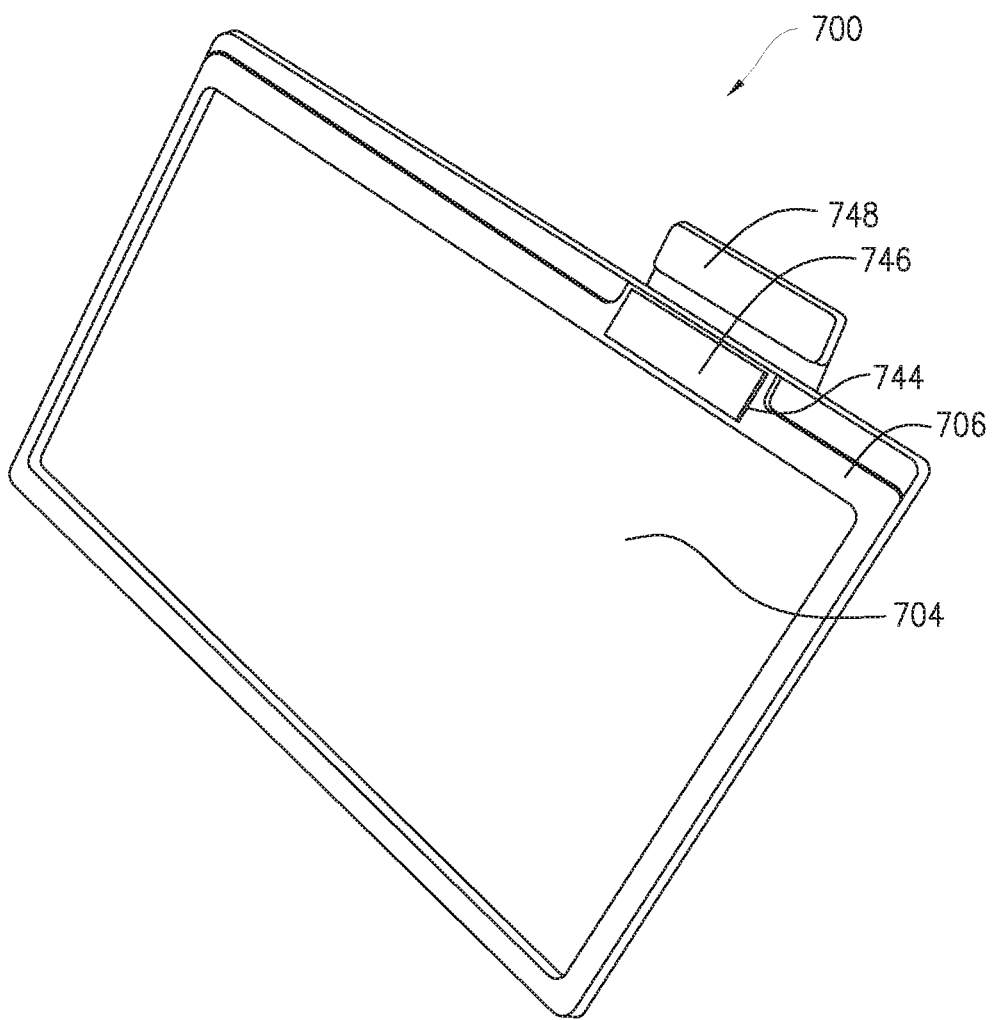
FIG. 53 is a front perspective view of the panel device of FIG. 47 after removal of the molding border.

As shown in FIGS. 51 and 52, prior to cooling and shrinking, the molded housing 706 and the encased light bearing and diffusing sheets 702, 704 retain a curvature complementary to the curvature of the mold 720. The curvature is visible along each side of the housing 706 (e.g., the top view of FIG. 51 and the side view of FIG. 52). As the assembly cools, the material of the housing 706 shrinks to encase the light bearing and diffusing sheets 702, 704 along the perimeter edges. Shrinking of the housing 706 results in the assembly losing the curvature seen in FIGS. 51 and 52, and returning to a substantially flat or straight configuration (see, e.g., FIG. 53). Because the housing 706 is overformed relative to the light bearing and diffusing sheets 702, 704, the housing 706 extends over and wraps around perimeter edges of the light bearing and diffusing sheets 702, 704 as the housing 706 shrinks, thereby retraining and securing the light bearing and diffusing sheets 702, 704 together relative to each and other to the housing 706. By initially forming a curved assembly and allowing the assembly to cool and return to the substantially flat configuration, the manufacturing process ensures that the components are secured to each other and prevents undesired deformation and/or cracking of the materials. Such manufacturing process allows the components to be restrained together without the use of adhesives and/or connectors.

Figure 54:
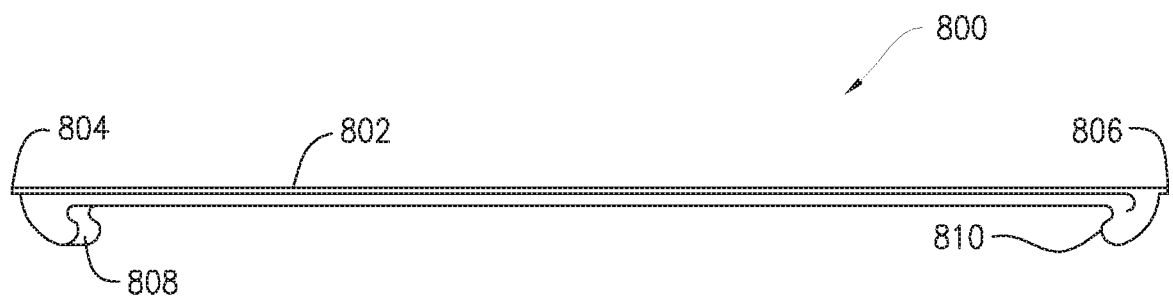
FIG. 54 is a side view of a mounting bracket for mounting the panel device of FIG. 53.
Figure 55:
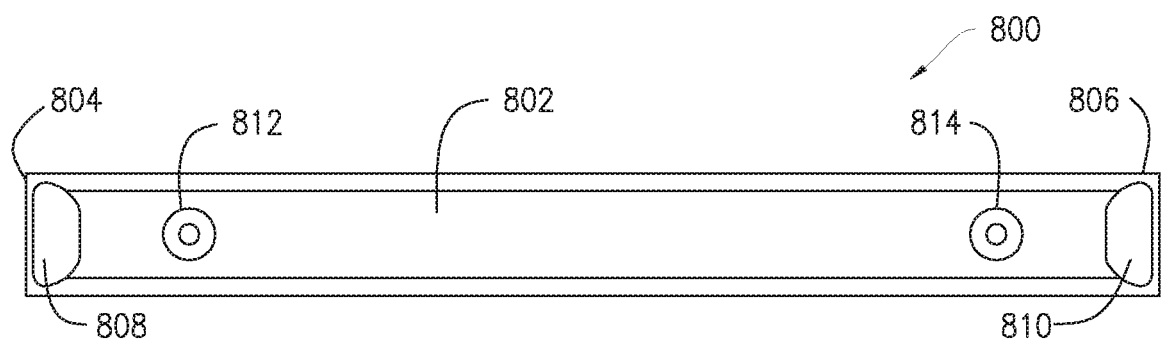
FIG. 55 is a front view of the mounting bracket of FIG. 54.

FIGS. 54 and 55 are side and front views of a mounting bracket 800 for detachably coupling the panel device 700 to the underside of a surface, such as a bottom surface of a cabinet. The mounting bracket 800 can be substantially similar in structure and/or function to the mounting bracket 500 of FIGS. 20-24, except for the distinctions noted herein. The mounting bracket 800 includes an elongated body 802 defining opposing proximal and distal ends 804, 806. The elongated body 802 can define a substantially planar configuration.

The proximal and distal ends 804, 806 can each include fixation portions 808, 810. The fixation portions 808, 810 can be in the form of curved hooks that curve inwardly and toward each other. The curved hooks of the fixation portions 808, 810 can extend at least partially over the elongated body 802. The ends of the fixation portions 808, 810 can be configured and dimensions to snap into and fit at least partially within the groove 750 of the panel device 700 to detachably couple the panel device 700 to a surface. The mounting bracket 800 includes two openings 812, 814 formed in and extending through the elongated body 802. The openings 812, 814 can receive fasteners for securing the mounting bracket 800 to a surface. Each of the openings 812, 814 can be counterbored to ensure the fastener remains below or at the plane defined by the body 802 surface, thereby preventing interference with mounting of the panel device 700.

Figure 56:
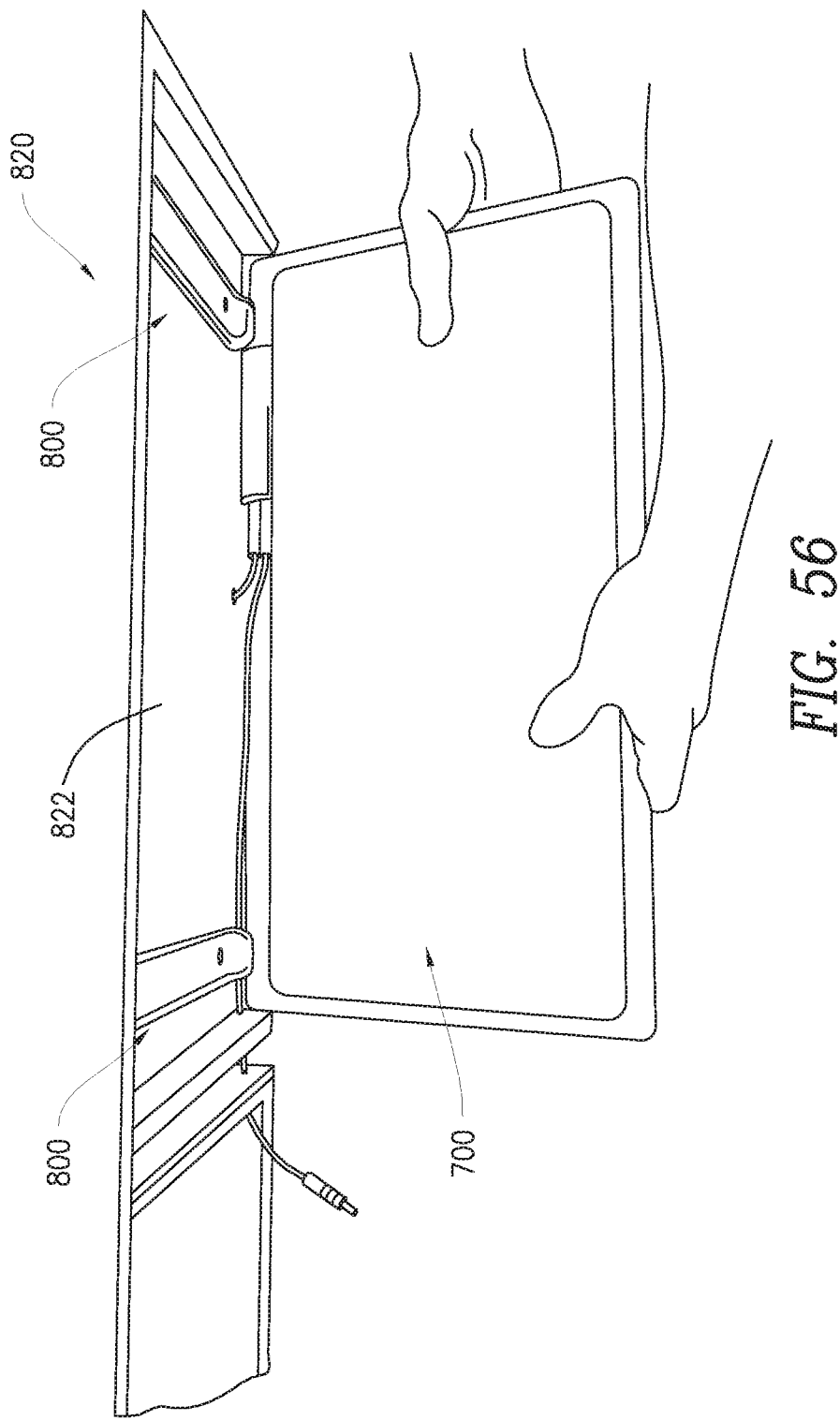
FIG. 56 is a front perspective view of the panel device of FIG. 53 during mounting within a recess of a cabinet.
Figure 57:
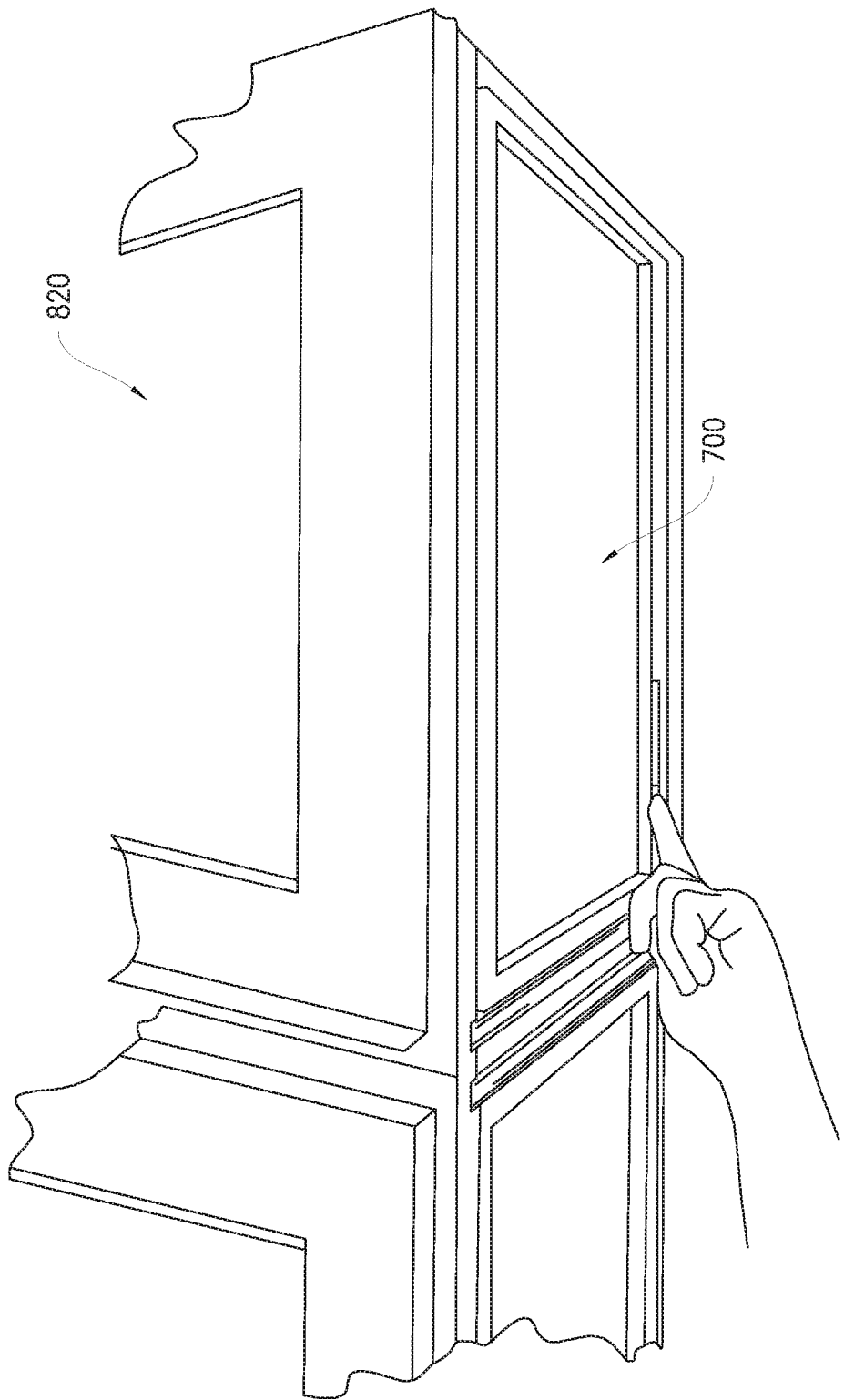
FIG. 57 is a front perspective view of the panel device of FIG. 53 after mounting within a recess of a cabinet.

FIGS. 56 and 57 show two mounting brackets 800 secured to the underside surface 822 of a cabinet 820. To detachably couple the panel device 700 with the cabinet 820, the groove 750 in the housing 706 can initially be aligned with the fixation portions 808 of the two mounting brackets 800, and subsequently pivoted against the opposing fixation portions 810 of the two mounting brackets 800. Application of upward force on the edge of the panel device 700 causes the fixation portions 810 to flex outwardly and snap around and into the groove 750 of the panel device 700, thereby securing the panel device 700 to the mounting brackets 800. Power cables associated with the panel devices 700 can be interconnected to connect all panel devices 700 to the same power source, with each panel device 700 having a controller that can independently control operation of the respective panel device 700. The panel device 700 in combination with the mounting brackets 800 can define a panel device system.

Figure 58:
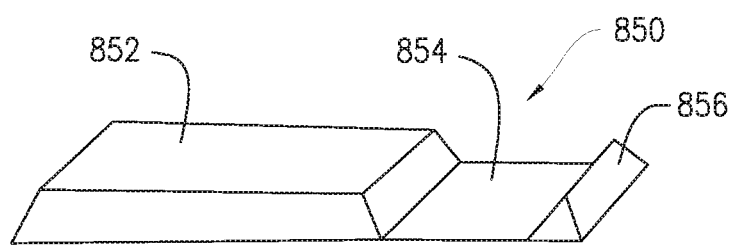
FIG. 58 is a perspective view of a removal tool for removing the panel device of FIG. 53 after mounting within a recess of a cabinet.
Figure 59:
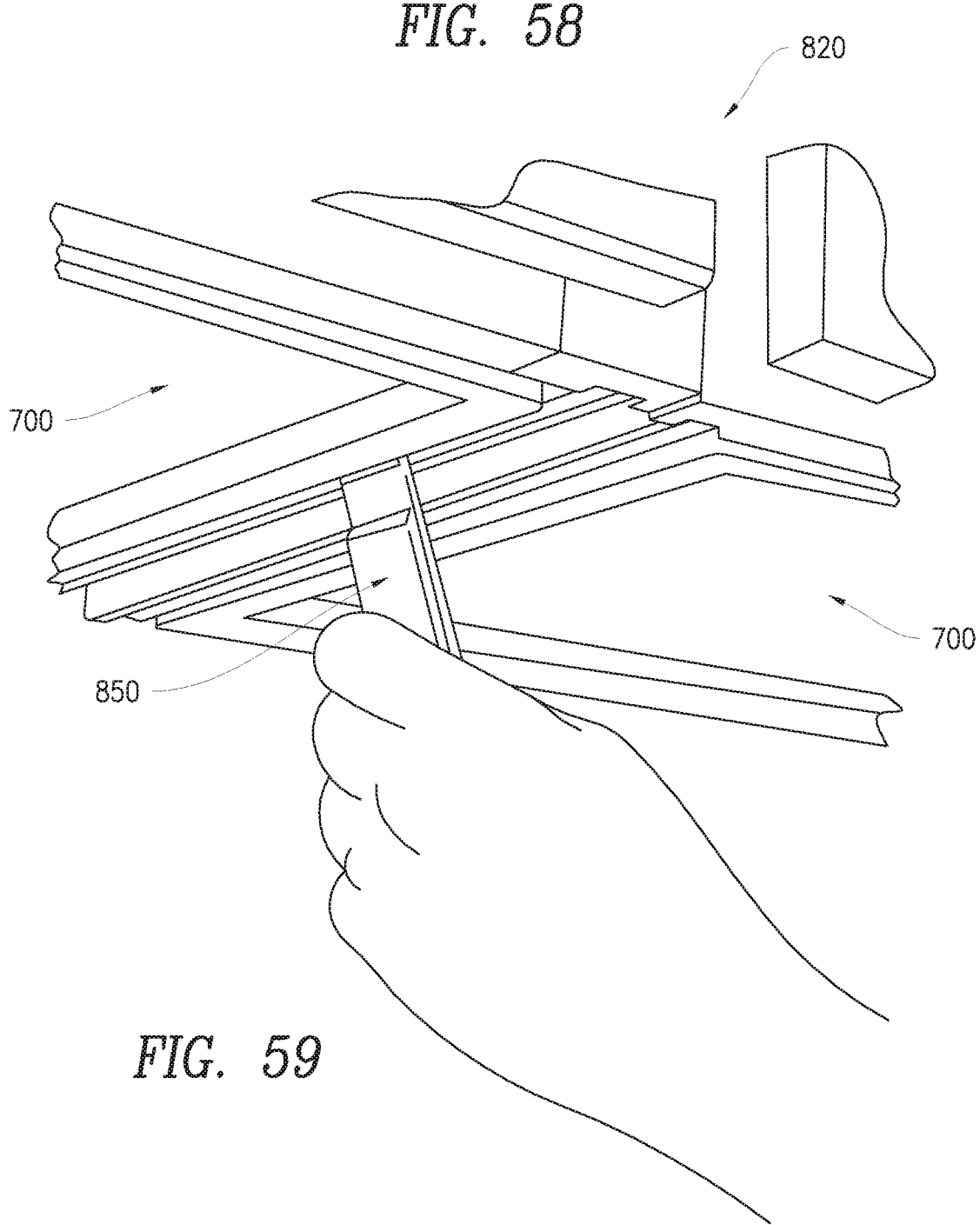
FIG. 59 is a perspective view showing removal of the panel device of FIG. 53 from a recess of a cabinet using the removal tool of FIG. 58.

FIG. 58 is a perspective view of a removal tool 850 for detachment and removal of the panel device 700 from the mounting brackets 800. The tool 850 includes a handle 852, a substantially planar extension 854 protruding from the handle 850, and a raised end 856 extending from the extension 854. The planar extension 854 can be substantially flat, and the raised end 856 can define a substantially triangular section extending perpendicularly from the extension 854. As shown in FIG. 59, to remove the panel device 700, the tool 850 can be inserted into a space between the cabinet 820 and the panel device 700. The edge of the panel device 700 can fit within the section of the tool 850 between the handle 850 and the raised end 856, and the tool 850 can be pivoted to snap the panel device 700 out of the mounting brackets 800. In some embodiments, the tool 850 can be positioned to align with the mounting bracket 800 to assist in outwardly flexing the fixation portions 808, 810 of the mounting brackets 800 to release the panel device 700.

Having thus described the disclosure in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method of manufacturing a composite plastic component having a first section surrounded by a second section, the method comprising:
   positioning a generally planar first section, formed of a first material on a mold and comprising a polarizing film applied to one or more surfaces of the first section, the mold having a curved top surface;
   heating a second section in the form of a frame, the second section formed of a second material;
   positioning the second section about the first section on the mold;
   pressing the first and second sections on the curved mold to curve the first and second sections in conformance with the curve of the mold, and to attach the frame to the first section;
   removing the curved first section and attached frame from the mold;
   cooling the curved first section and attached frame; and
   allowing the first section to return from a curved shape to a planar shape, the frame positioned about the first section to form a composite component.

2. The method of claim 1, wherein the composite plastic component is a light panel device.

3. The method of claim 1, comprising positioning a generally planar third section, formed of a third material, on the first section and the mold.

4. The method of claim 3, wherein the first section is a light bearing panel, the third section is a light diffusing panel, and the second section is a housing.

5. The method of claim 4, wherein the light diffusing panel is fabricated from a high-transparency acrylic.

6. The method of claim 1, wherein the frame is attached to the first section without adhesive or fasteners.

7. The method of claim 1, wherein the first section is fabricated from a single piece of material.

8. The method of claim 1, comprising securing a light source strip to at least one edge of the first section.

9. The method of claim 8, wherein the light source strip comprises a plurality of light-emitting diodes.

10. The method of claim 9, wherein the light source strip is secured to the first section with an optically clear adhesive strip without addition of a heat dissipating element to the first section and the light source strip, heat from the plurality of light-emitting diodes dissipating directly through and from a front surface of each of the plurality of light-emitting diodes.

11. The method of claim 8, wherein the light source strip is secured to the first section with an optically clear adhesive strip.

12. The method of claim 10, wherein the light source strip is secured to the first section with an adhesive strip such that the plurality of light-emitting diodes face inwardly toward the adhesive strip and an unpolished perimeter edge of the first section, the adhesive strip providing a substantially seamless media for light transmission to the first section.

13. The method of claim 8, wherein the frame is positioned about the first section and the light source strip.

14. The method of claim 1, wherein the second material of the frame is a high impact polystyrene.

15. The method of claim 1, wherein the second section is heated to about 300° F.

16. The method of claim 1, wherein the curved first section and the attached frame are cooled to about 110° F.

17. The method of claim 1, comprising cooling the curved first section and the attached frame by applying air to the curved first section and the attached frame with one or more fans.

18. The method of claim 1, comprising cooling the curved first section and the attached frame by applying a water mist to the curved first section and the attached frame.

* * * * *